US007762735B2

(12) United States Patent
Clayton, III et al.

(10) Patent No.: US 7,762,735 B2
(45) Date of Patent: Jul. 27, 2010

(54) SELF-LOCKING, QUICK-RELEASING, AND SELF-RELEASING BALL-AND-SOCKET LATCH SYSTEM

(75) Inventors: Frank Brittin Clayton, III, Boulder, CO (US); Richard Adams, Boulder, CO (US)

(73) Assignee: Cedar Mesa Design Company, LLC, Boulder, CO (US)

( * ) Notice: Subject to any disclaimer, the term of this patent is extended or adjusted under 35 U.S.C. 154(b) by 0 days.

(21) Appl. No.: 11/740,789

(22) Filed: Apr. 26, 2007

(65) Prior Publication Data

US 2007/0253764 A1 Nov. 1, 2007

Related U.S. Application Data

(60) Provisional application No. 60/795,308, filed on Apr. 27, 2006.

(51) Int. Cl.
*F16D 3/00* (2006.01)
*F16C 11/00* (2006.01)

(52) U.S. Cl. ............................ 403/76; 403/83; 403/111; 403/325; 403/327; 292/341.17; 280/512

(58) Field of Classification Search .................. 403/56, 403/76, 83, 90, 101, 102, 109.3, 111, 114, 403/122, 123, 124, 149, 325, 327; 292/76, 292/146.1, 194, 195, 198, 203, 210, 252, 292/341.15, 341.17; 248/288.1, 288.2, 288.31; 16/307, 342; 15/144.1, 144.2, 229.6; 267/154, 267/155, 157, 166, 167, 173, 174, 178, 179; 280/511–513
See application file for complete search history.

(56) References Cited

U.S. PATENT DOCUMENTS 195,025 A 9/1877 Lane (Continued)

FOREIGN PATENT DOCUMENTS

DE 3716343 A1 12/1988

(Continued)

OTHER PUBLICATIONS

Althouse et al., Modern Welding (1997) pp. 354 and 630, published in the United States in 1997.

(Continued)

*Primary Examiner*—Daniel P Stodola
*Assistant Examiner*—Nahid Amiri
(74) *Attorney, Agent, or Firm*—Faegre & Benson LLP

(57) ABSTRACT

An apparatus according to embodiments of the present invention includes a socket having at least three ball support points to constrain a ball, and a yoke rotatably coupled to the socket, the yoke having an axis of rotation that intersects the ball when the ball is positioned in the socket, the yoke rotatable to a closed position in which the yoke captures the ball in the socket, and the yoke rotatable to an open position in which the yoke does not capture the ball in the socket. According to some embodiments, the yoke is biased in the closed position such as, for example, by a spring. The yoke may be rotationally coupled to the socket at one or more locations, and the axis of rotation may intersect the ball when the ball is in the socket either through the center of the ball or at an off-center location.

16 Claims, 16 Drawing Sheets

U.S. PATENT DOCUMENTS

| | | | |
|---|---|---|---|
| 596,207 A * | 12/1897 | Hart | 403/90 |
| 2,204,882 A | 6/1940 | Berluti | |
| 2,219,955 A | 10/1940 | Gilmore | |
| 2,435,024 A | 1/1948 | Wagner | |
| 2,515,856 A * | 7/1950 | Brougher | 280/506 |
| 2,563,530 A | 8/1951 | Hawkins | |
| 2,578,317 A * | 12/1951 | Pealer | 200/50.06 |
| 2,724,589 A * | 11/1955 | Misic | 267/275 |
| 2,732,222 A | 1/1956 | Harroun et al. | |
| 2,744,767 A | 5/1956 | Kleiman | |
| 2,768,839 A | 10/1956 | Riemann | |
| 2,783,060 A | 2/1957 | Arend | |
| 2,855,222 A * | 10/1958 | Bolmes et al. | 280/512 |
| 2,869,896 A * | 1/1959 | Matthews et al. | 280/512 |
| 2,975,006 A * | 3/1961 | Symer | 384/190.4 |
| 3,049,366 A | 8/1962 | Peters | |
| 3,067,985 A | 12/1962 | Cusack | |
| 3,114,564 A * | 12/1963 | Ulvestad | 280/512 |
| 3,153,545 A | 10/1964 | Bolmes et al. | |
| 3,433,510 A * | 3/1969 | Hulterstrum | 403/77 |
| 3,596,355 A * | 8/1971 | Wertepny, Sr. | 30/252 |
| 3,658,363 A * | 4/1972 | Marler | 280/511 |
| 3,954,286 A | 5/1976 | Weber | |
| 4,018,453 A | 4/1977 | Bigelow | |
| 4,133,553 A | 1/1979 | Pierce | |
| 4,209,184 A | 6/1980 | Byers | |
| 4,283,073 A * | 8/1981 | Gostomski et al. | 280/508 |
| 4,339,114 A | 7/1982 | Deike | |
| 4,360,285 A | 11/1982 | Magness | |
| 4,383,782 A | 5/1983 | Pillifant, Jr. | |
| 4,426,172 A * | 1/1984 | Hildebrand | 403/122 |
| 4,444,410 A | 4/1984 | Martin | |
| 4,533,121 A | 8/1985 | Basey | |
| 4,580,822 A * | 4/1986 | Fukumoto | 292/336.3 |
| 4,768,895 A * | 9/1988 | Ludwig et al. | 403/77 |
| 4,817,979 A | 4/1989 | Goettker | |
| 5,344,174 A | 9/1994 | Sanders | |
| 5,544,626 A * | 8/1996 | Diggs et al. | 123/90.16 |
| 5,573,263 A | 11/1996 | Denny et al. | |
| 5,674,027 A * | 10/1997 | Warnaar | 403/404 |
| 5,676,484 A * | 10/1997 | Chamberlin et al. | 403/122 |
| 5,887,885 A | 3/1999 | Byers et al. | |
| 6,048,125 A * | 4/2000 | Droche et al. | 403/12 |
| 6,142,704 A | 11/2000 | Coyne | |
| 6,151,772 A | 11/2000 | Pigott et al. | |
| 6,176,043 B1 | 1/2001 | Gibbs | |
| 6,254,064 B1 | 7/2001 | Gibbs | |
| 6,299,143 B1 | 10/2001 | Valentine | |
| 6,311,957 B1 | 11/2001 | Driscoll et al. | |
| 6,318,318 B1 * | 11/2001 | Jahr | 123/90.16 |
| 6,375,171 B1 * | 4/2002 | Zimmermann et al. | 267/137 |
| D465,856 S | 11/2002 | Givens et al. | |
| D466,620 S | 12/2002 | Givens et al. | |
| D467,669 S | 12/2002 | Givens et al. | |
| D468,028 S | 12/2002 | Givens et al. | |
| 6,517,093 B2 * | 2/2003 | Feng | 280/87.042 |
| 6,519,908 B1 | 2/2003 | Masterson et al. | |
| 6,627,832 B2 | 9/2003 | Vittone | |
| 6,631,887 B1 | 10/2003 | Walmsley | |
| 6,637,765 B2 * | 10/2003 | Barton | 280/507 |
| 6,648,304 B1 | 11/2003 | Zhu | |
| 6,739,583 B2 | 5/2004 | Ryon | |
| 6,752,385 B2 | 6/2004 | Zen et al. | |
| 6,811,145 B2 | 11/2004 | Gibbs et al. | |
| 6,811,146 B1 | 11/2004 | Giralt | |
| 6,817,155 B2 | 11/2004 | Larson | |
| 6,874,767 B1 | 4/2005 | Gibbs | |
| 6,912,787 B1 | 7/2005 | Ruble et al. | |
| 6,957,979 B2 * | 10/2005 | Welsh et al. | 439/565 |
| 6,969,051 B1 | 11/2005 | Gibbs | |
| 7,025,315 B2 * | 4/2006 | Carnevali | 248/276.1 |
| 7,044,949 B2 * | 5/2006 | Orszulak et al. | 606/34 |
| 7,071,439 B2 | 7/2006 | Gibbs et al. | |
| 7,086,642 B1 | 8/2006 | O'Brien | |
| 7,090,202 B1 | 8/2006 | O'Brien | |
| 7,159,853 B2 | 1/2007 | Gibbs et al. | |
| 7,172,237 B2 * | 2/2007 | Bauman et al. | 296/146.1 |
| D546,735 S * | 7/2007 | Hahne et al. | D12/162 |
| 7,282,659 B1 | 10/2007 | Gibbs et al. | |
| 7,568,682 B2 * | 8/2009 | Seelmann et al. | 267/179 |
| 2007/0227830 A1 * | 10/2007 | Svitavsky et al. | 187/366 |

FOREIGN PATENT DOCUMENTS

| | | | |
|---|---|---|---|
| GB | 2093513 A1 | 9/1982 | |
| JP | 53-69439 A | 6/1978 | |
| JP | 10252212 A | 9/1998 | |

OTHER PUBLICATIONS

Amstead et al., Manufacturing Processes, Seventh Edition, pp. 199-203, published in the United States in 1977.

Lindberg, Process and Materials of Manufacture, pp. 316-317, published in the United States in 1965.

Society of Manufacturing Engineers, Tool and Manufacturing Engineers Handbook, vol. IV, pp. 9-101, 9-119. 9-120, 9-121 and 9-122, published in the United States in 1987.

American Welding Society, Welding Handbook, Seventh Edition, vol. 3 (1980), pp. 21 and 28-30, published in the United States in 1980.

International Search Report and Written Opinion dated Feb. 6, 2008 for PCT Application No. PCT/US2007/67568.

* cited by examiner

SELF-LOCKING, QUICK-RELEASING, AND SELF-RELEASING BALL-AND-SOCKET LATCH SYSTEM

CROSS-REFERENCE TO RELATED APPLICATIONS

This application claims the benefit of U.S. Provisional Patent Application No. 60/795,308, filed on Apr. 27, 2006, and entitled, "Self-Locking, Quick-Releasing, and Self-Releasing Ball-and-Socket Latch System." The aforementioned application is incorporated by reference herein for all purposes.

TECHNICAL FIELD

Embodiments of the present invention relate generally to ball-and-socket connections, and more specifically to systems and methods for releasably coupling a ball to a socket.

BACKGROUND

Current ball-and-socket connections are often permanent connections which do not permit removal of the ball from the socket or the use of different balls with the same socket, resulting in increased equipment costs and limitations in customizability. Current ball-and-socket connections which do permit removal of the ball from the socket often require locking mechanisms which are difficult or time-consuming to operate, or do not permit a useful degree of rotation of the ball within the socket, or are not self-releasing. For example, current ball-and-hitch connections, such as those used to hitch a trailer to an automobile, often require a collar-like or pawl-like mechanism to move into place under the ball with the express goal of preventing easy release or self-release of the ball from the hitch.

SUMMARY

Embodiments of the present invention include a latch system in which a socket and a locking yoke can alternately capture and release a ball. In some embodiments, as the ball is pushed into the socket, a spring-loaded locking yoke is rotationally displaced to allow the ball to enter the socket. When the ball is fully inserted into the socket, the spring automatically rotates the locking yoke to its original position, where it captures the ball and prevents it from escaping the socket. Within a certain range, the ball remains free to rotate within the socket without escaping the socket. When the locking yoke is rotated sufficiently in a certain direction, the ball becomes uncaptured and can escape the socket.

In some embodiments, the ball is coupled to a shaft. The locking yoke may be rotated to release the ball from the socket in at least three ways, according to embodiments of the present invention: the user of the latch system may manually rotate the locking yoke; the user of the latch system may manually rotate the ball-and-shaft assembly so that the shaft contacts the locking yoke and rotates it; and/or gravity can act upon the shaft or any object attached to the shaft such that when the shaft or the object falls, the shaft rotates the locking yoke without the manual intervention of the user. Thus, the ball-and-socket latch system according to embodiments of the present invention may be self-locking, quick-releasing (using either of two methods, for example), and self-releasing (utilizing gravity, for example).

An apparatus to releasably capture a ball according to embodiments of the present invention includes a socket configured to constrain a ball, a yoke rotatably coupled to the socket, the yoke having an axis of rotation that intersects the ball when the ball is positioned in the socket, in which the yoke is rotatable to a closed position in which the yoke captures the ball in the socket and to an open position in which the yoke does not capture the ball in the socket. The yoke may be biased toward the closed position by, for example, a torsion spring at the axis of rotation. An axle may be coupled to the socket, to which the yoke may be rotatably coupled. The torsion spring may include a first end to engage the axle and a second end to engage the yoke, for example. In some cases, the axle includes a slot to receive one end of the torsion spring and the yoke includes another slot to receive the other end of the torsion spring; in such cases, the axle may include a first mating element and the socket may include a second mating element, such that engaging the one end of the torsion spring with the slot in the axle and the other end of the torsion spring with the slot in the yoke and engaging the first mating element with the second mating element applies a preload to the torsion spring. According to some embodiments of the present invention, the first mating element is a flatted cutaway, and the second mating element is a flatted protrusion. The surface of the ball may be substantially spherical and/or substantially spheroidal, according to embodiments of the present invention.

According to such embodiments of the present invention, the yoke may be biased toward the closed position by one or more springs such as, for example, a torsion spring, a compression spring, a tension spring, a flat spring, an elastic cord, and an elastic band. The yoke may be biased toward the closed position by a biasing force, such that the yoke rotates to an open position when an opening force applied to the yoke overcomes the biasing force. In some cases, the biasing force automatically returns the yoke to the closed position in an absence of the opening force. According to some embodiments, the opening force is supplied by wedging the ball between the yoke and the socket during insertion of the ball into the socket, and in other embodiments, the ball is coupled to an attachment, and the opening force is supplied by rotating the attachment against the yoke.

The yoke may be rotatably coupled to the socket at a single location, at two locations, and at more than two locations, for example. The axis of rotation of the yoke may intersect the center of the ball when the ball is positioned in the socket; alternatively, the axis of rotation of the yoke may intersect the ball when the ball is in the socket yet not intersect the center of the ball, according to embodiments of the present invention. Embodiments of the present invention may further include a ball and an attachment coupled to the ball. The attachment may be, for example, a shaft, a rod, a bar, a tab, a handle, a dog, a cord, a cable, a strap, a rope, a hook, a chain, and/or a wire. The attachment may be configured to be rotated against the yoke to move the yoke from the closed position toward the open position. According to some embodiments of the present invention, the attachment and the ball have three rotational degrees of freedom with respect to the socket while the yoke remains in the closed position while the ball is positioned in the socket.

An apparatus to releasably capture a ball according to other embodiments of the present invention includes a ball, an attachment coupled to the ball, a socket configured to constrain the ball, and a yoke rotatably coupled to the socket, such that an axis of rotation of the yoke intersects the ball when the ball is positioned in the socket. According to such embodiments, the yoke is rotatable to a closed position in which the yoke captures the ball in the socket and in which radial forces applied to the ball by the attachment cannot release the ball from the socket without breaking the apparatus, and the yoke is rotatable to an open position in which the yoke does not capture the ball in the socket and permits removal of the ball from and insertion of the ball into the socket. According to such embodiments, the attachment and the ball have three rotational degrees of freedom with respect to the socket while the yoke remains in the closed position while the ball is positioned in the socket.

An apparatus according to yet other embodiments of the present invention includes a socket, a yoke rotatably coupled to the socket, such that the yoke has an axis of rotation that intersects a ball when the ball is positioned in the socket. According to such embodiments, the yoke is rotatable to a closed position in which the ball is captured between the yoke and the socket, and the yoke is rotatable to an open position in which the ball is not captured between the yoke and the socket; a spring may be included to bias the yoke toward the closed position. According to some embodiments, the yoke contacts the ball in the closed position, and does not contact the ball in the open position. According to other embodiments, the spring is located at the axis of rotation, and/or the spring is a torsion spring. Embodiments of the present invention may further include an axle coupled to the socket, such that the yoke is rotatably coupled to the axle, and such that the torsion spring includes one end to engage the axle and another end to engage the yoke. According to alternative embodiments of the present invention, the spring may be a segment of elastic material coupled to the yoke and the socket.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
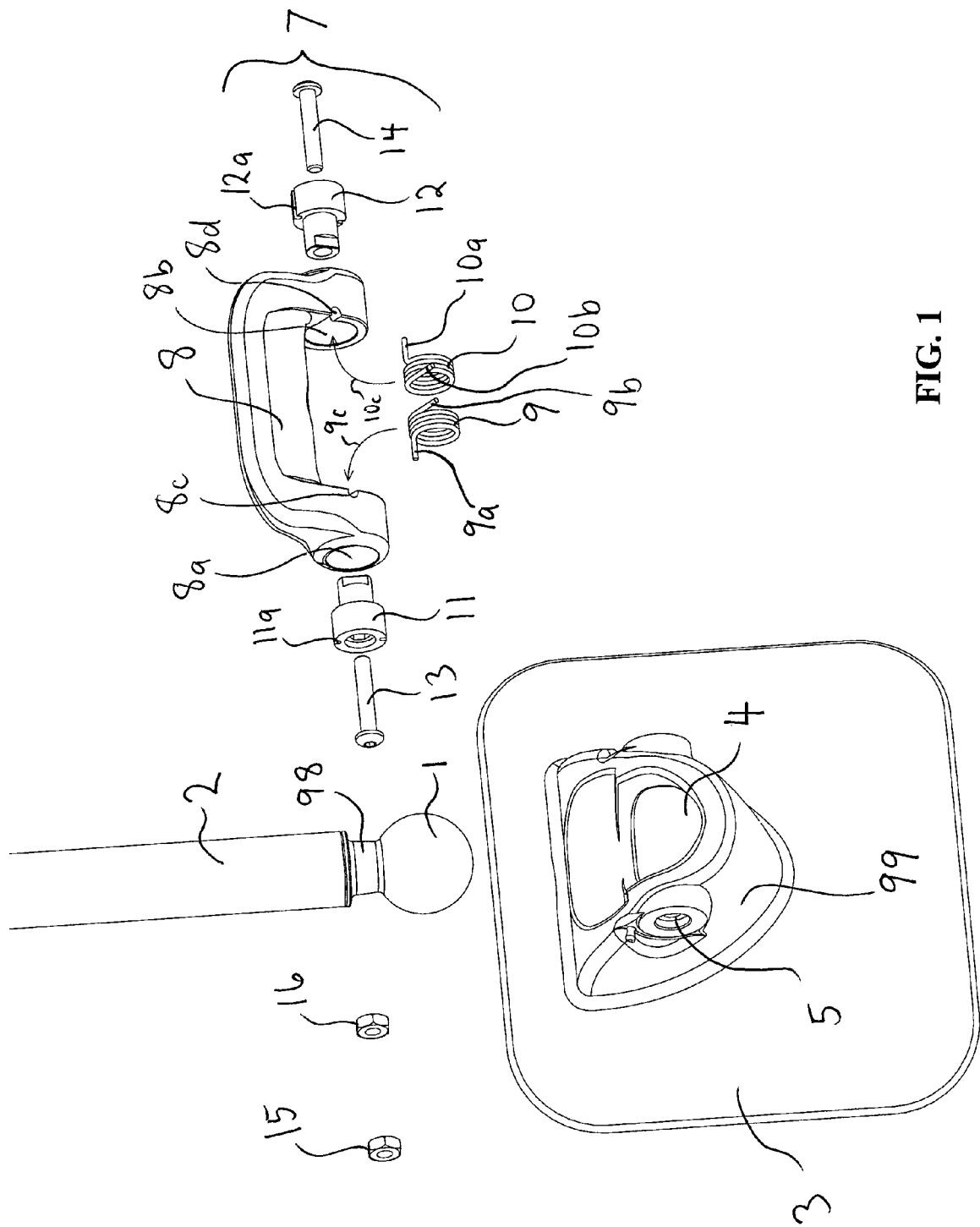
FIG. 1 is an exploded front perspective view of a ball-and-socket latch system in accordance with a particular exemplary embodiment of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 shows a ball 1 coupled to a shaft 2, according to embodiments of the present invention. According to some embodiments of the present invention, the shaft 2 may include a neck portion 98 which is coupled to the ball 1. As used herein, the term "coupled" is used in its broadest sense to refer to elements which are connected, attached, and/or engaged, either directly or integrally or indirectly via other elements, and either permanently, temporarily, or removably. As used herein, the term "rotatably coupled" is used in its broadest sense to refer to elements which are coupled in a way that permits one element to rotate in relation to another element. In some embodiments of the present invention, the ball is permanently coupled with a shaft; according to other embodiments of the present invention, the ball is removably coupled with the shaft such as, for example, via a threaded connection.

As used herein, the term "ball" is used in its broadest sense to refer to a three-dimensional solid object having a convex area of surface that is wholly or partly spherical, spheroidal, hemispherical, merospherical, or generally round. As such, a ball can be completely solid or can have one or more hollow interior regions. A ball can also have non-spherical surface areas involving one or more deficits or protrusions from a perfectly spherical outline, and a ball can be coupled with and/or attached to another object of any shape, such as, for example, a shaft.

FIG. 1 also shows a shaped housing 3 that includes an outer socket surface 99, a socket 4, and shaped left apertures 5 and right apertures (not shown) for receiving various components of the locking yoke assembly 7, according to embodiments of the present invention. As used herein, the term "socket" is used in its broadest sense to refer to a three-dimensional solid object having at least three surface points configured to support and/or constrain a ball. According to some embodiments of the present invention, a concave merospherical surface of a socket corresponds to a convex merospherical surface of a ball having approximately the same radius as the socket, such that the ball rotates smoothly within the socket, friction between the ball and socket is minimized, and/or forces transmitted through the ball are more evenly distributed to the socket. In addition, although embodiments of the present invention describe the socket 4 formed within the housing 3, and the locking yoke 8 rotatably coupled to the housing 3, the term "socket" is also used in its broadest sense to refer not only to socket 4, but also to surrounding housing 3 and socket outer surface 99, for example, such that rotatably coupling the locking yoke 8 with the socket 4 includes rotatably coupling the locking yoke 8 with the socket outer surface 99 or the housing 3 surrounding the socket 4. In some embodiments, the housing 3 may be fully or partially hollow between the socket 4 and the outer socket surface 99 to conserve manufacturing materials, reduce product weight, and/or to facilitate assembly.

Referring again to FIG. 1, the locking yoke assembly 7 includes a locking yoke 8, a left torsion spring 9 and a right torsion spring 10, a left axle 11 and a right axle 12, a left bolt 13 and a right bolt 14, and a left nut 15 and a right nut 16, according to embodiments of the present invention. FIG. 1 illustrates how the left torsion spring 9 and right torsion spring 10 mate with the locking yoke 8, left axle 11, and right axle 12, according to embodiments of the present invention. Left torsion spring 9 has an outer arm 9a and an inner arm 9b. Right torsion spring 10 has an outer arm 10a and an inner arm 10b. Left torsion spring 9 and right torsion spring 10 may be inserted into the left hollow end 8a and right hollow end 8b, respectively, of the locking yoke 8, as shown by arrows 9c and 10c, respectively. As used herein, the term "spring" is used in its broadest sense to refer to any device having a spring constant or other elastic properties. The outer arm 9a of left torsion spring 9 may be positioned into a top slot 11a in the left axle 11; and the inner arm 9b of left torsion spring 9 may be positioned into a left slot 8c in the locking yoke 8. Correspondingly, the outer arm 10a of left torsion spring 10 may be positioned into a top slot 12a in the left axle 12; and the inner arm 10b of left torsion spring 10 may be positioned into a right slot 8d in the locking yoke 8. The assembly and function of the locking yoke assembly 7 is discussed in more detail below in connection with FIGS. 11 and 12.

Figure 2:
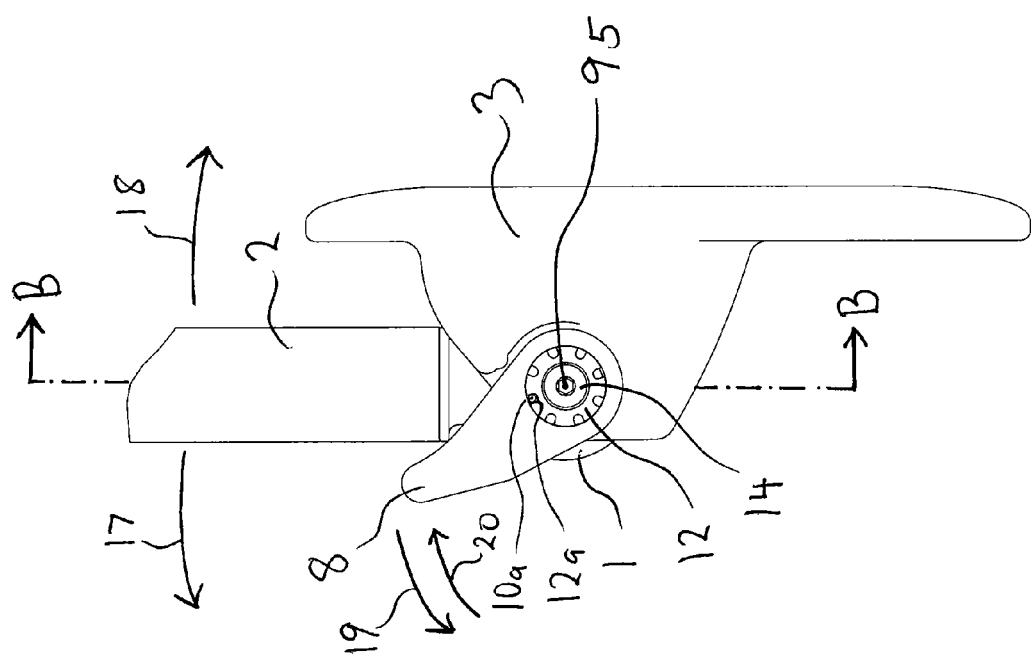
FIG. 2 is a right side view of the embodiment of FIG. 1, showing the latch system in a configuration with the ball inserted into the socket, according to an embodiment of the present invention.

FIG. 2 illustrates the shaft 2 extending from the ball 1 which has been inserted into the socket 4 of the housing 3. The locking yoke 8 is shown in a closed position, in which the locking yoke 8 captures the ball 1 in the socket 4, thereby preventing the ball 1 from escaping the housing 3. As used herein, the term "closed position" refers to a position of the yoke 8 with respect to the socket 4 which captures the ball 1 between the yoke 8 and the socket 4. As used herein, the term "capture" is used in its broadest sense to refer to a state in which moving or trying to move the ball 1 a relatively short distance in any direction results in the ball 1 being constrained or otherwise stopped, such that the ball 1 is substantially prevented from being removed and/or disengaged from the yoke 8 and socket 4 assembly. As used herein, the term "constrain" is used in its broadest sense to refer to a state in which moving or trying to move the ball 1 a relatively short distance in the direction of a constraining object results in the ball 1 being stopped or prevented from further movement. For example, the socket 4 alone may constrain the ball 1 because trying to move the ball 1 into or through the socket 4 results in the ball 1 being held or otherwise stopped by the socket 4, while socket 4 alone may not necessarily capture the ball 1 if the ball 1 is free to move in other directions without being stopped. In addition, the ball 1 can be "within" or "positioned in" the socket 4 without actually contacting the socket 4 and/or without actually contacting the socket 4 over more than three points, according to embodiments of the present invention.

However, because the ball 1 and the socket may have mating merospherical or hemispherical surfaces according to embodiments of the present invention, the ball 1 is free to rotate within the socket 4, such that the shaft 2 is free to move, within certain ranges, forward and backward in the directions shown by arrows 17 and 18 (as well as in other directions). According to some embodiments of the present invention, the ball 1 and shaft 2 have three degrees of freedom with respect to socket 4 when the ball is captured in the socket 4, and according to some embodiments of the present invention, the ball 1 and shaft 2 have three rotational degrees of freedom with respect to socket 4 when the ball is captured in the socket 4.

FIG. 2 also shows a distal end of the outer arm 10a of the right torsion spring 10 lying in the top slot 12a of the right axle 12. As is discussed in greater detail below, the locking yoke 8 rotates about the right axle 12 and the right bolt 14 (and about the left axle 11 and left bolt 13, not shown) in the directions shown by arrows 19 and 20. The right torsion spring 10 and the left torsion spring 9 (not shown) automatically rotate the locking yoke 8 in the direction shown by arrow 20. When the locking yoke 8 is rotated as shown in FIG. 2, the locking yoke 8 is in a closed position and thereby captures the ball 1 in the socket 4 and prevents the ball 1 from escaping the socket 4 and the housing 3. When the locking yoke 8 is rotated sufficiently in the direction shown by arrow 19, the locking yoke 8 is in an open position and ceases to capture the ball 1 in the socket 4, and the ball 1 is then free to escape the socket 4 and the housing 3. As used herein, the term "open position" refers to a position of the yoke 8 with respect to the socket 4 which does not capture the ball 1 between the yoke 8 and the socket 4, such that the ball 1 is free to be released, removed, and/or disengaged from the socket 4 and the housing 3.

Figure 3:
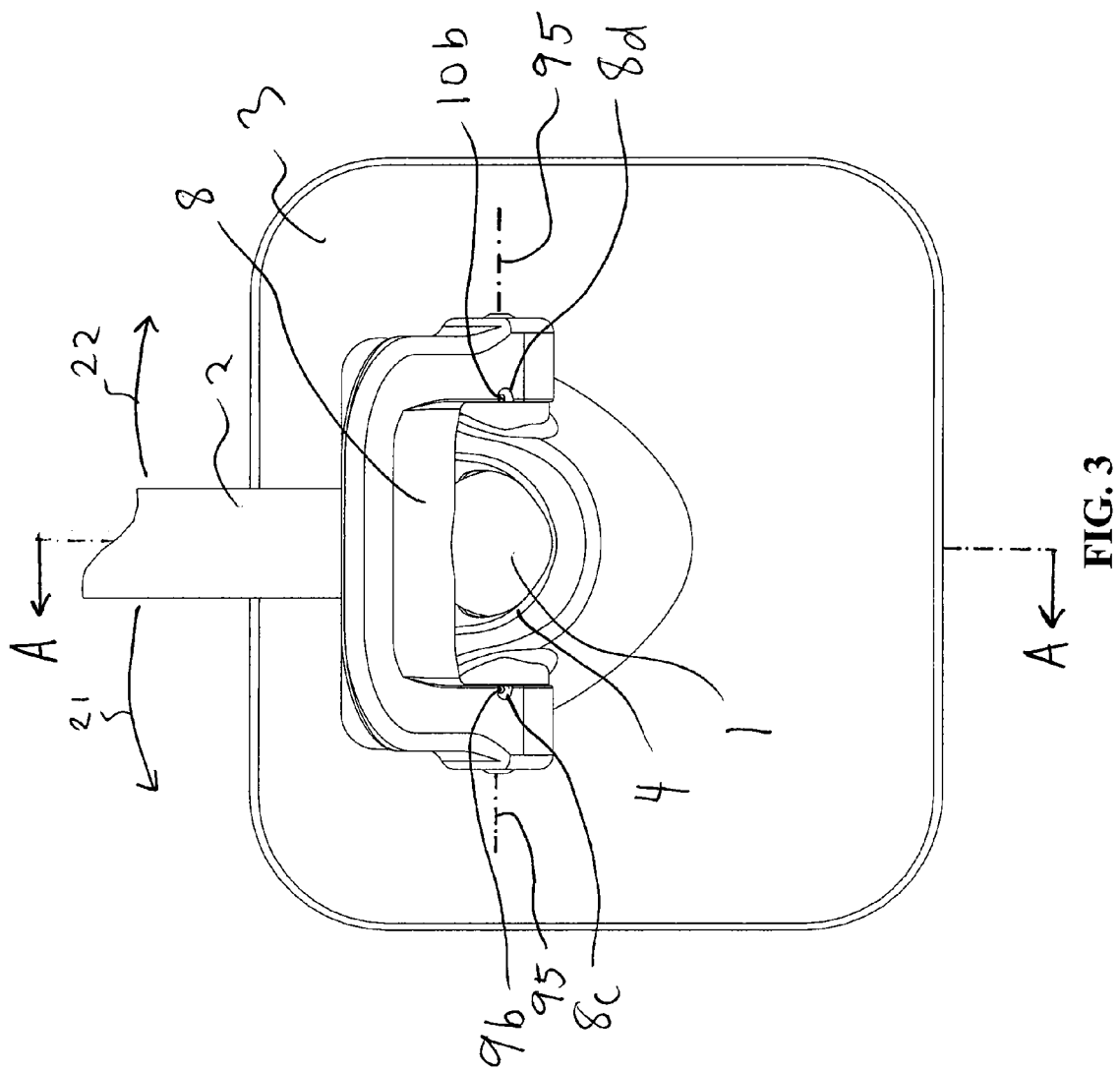
FIG. 3 is a front view of the embodiment of FIGS. 1 and 2, showing the latch system in a configuration with the ball inserted into the socket, according to an embodiment of the present invention.

FIG. 3 illustrates a frontal view of the shaft 2 with the ball 1 inserted into the socket 4 of the housing 3, according to embodiments of the present invention. The locking yoke 8 is shown in a closed position, where the yoke 8 captures the ball 1 within the socket 4 and thereby prevents the ball 1 from escaping the socket 4 and the housing 3. Again, the ball 1 is free to rotate within the socket 4, such that the shaft 2 is free to move to the left and to the right in the directions shown by arrows 21 and 22, respectively (as well as in other directions such as, for example, in the directions indicated by arrows 17 and 18 of FIG. 2). FIG. 3 also shows a proximate end of the inner arm 9b of the left torsion spring 9 positioned within the left slot 8c of the locking yoke 8, as well as a proximate end of the inner arm 10b of the right torsion spring 10 positioned within the right slot 8d of the locking yoke 8, according to embodiments of the present invention.

As illustrated in FIGS. 2 and 3, an axis of rotation 95 of the locking yoke 8 intersects the ball 1 when the ball 1 is within the socket 4, according to embodiments of the present invention. According to embodiments of the present invention, the axis of rotation 95 of the locking yoke 8 would still "intersect the ball" even if the ball 1 were formed to include a slot, or bore, or other deficit or occlusion aligned with the axis of rotation 95 such that the axis of rotation 95 did not intersect any solid region of the ball. According to embodiments of the present invention, the axis of rotation 95 of the locking yoke 8 "intersects the ball" if it intersects an imaginary sphere having a radius the same as the largest radius of the ball 1 and having the same center as the ball 1 when the ball 1 is located within the socket 4. Locating the axis of rotation 95 to intersect the ball 1 contributes to self-locking, quick-releasing, and self-releasing capabilities of the locking yoke 8 and socket 4 assembly, because it permits the ball 1 to displace the locking yoke 8 when the ball 1 is inserted into the socket 4, and it permits an attachment to the ball 1, such as, for example, the shaft 2, to be rotated into the yoke 8 to release the ball 1, according to embodiments of the present invention. In addition, locating the axis of rotation 95 to intersect the ball 1 causes the locking yoke 8 to rotate in an arc that is more or less concentric to the surface of the ball 1, which minimizes the overall space occupied by the ball-and-socket latch system, particularly when compared to existing ball-and-hitch systems in which a pawl or other retaining device often approaches the ball from a more or less radial angle and often in a linear fashion.

Figure 4:
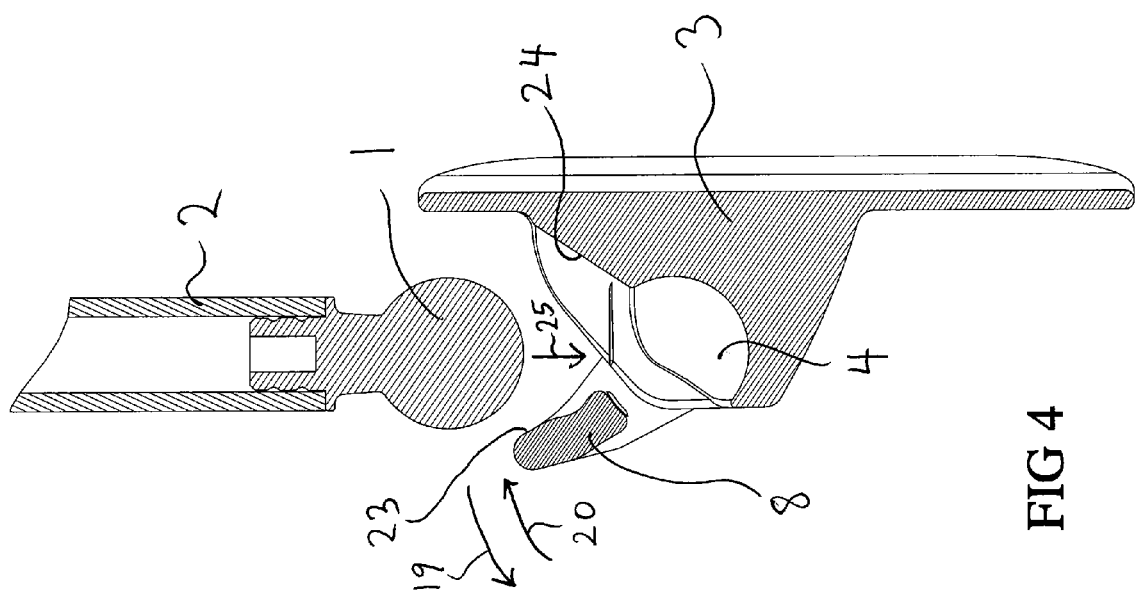
FIG. 4 is a right side cross-sectional view of the embodiment of FIGS. 1-3, taken along line A-A of FIG. 3, showing the ball in a position prior to its insertion into the socket, according to an embodiment of the present invention.

FIG. 4 depicts a right side cross-sectional view of the shaft 2 and ball 1 prior to the insertion of the ball 1 into the socket 4 of the housing 3. Locking yoke 8 is shown in a closed position, where the yoke 8 is held in position by left torsion spring 9 and right torsion spring 10. Also shown in this view are the back-guiding surface 23 of locking yoke 8 and front-guiding surface 24 of housing 3. Back-guiding surface 23 and front-guiding surface 24 create a conical or V-shaped region configured to facilitate guiding the ball 1 into the socket 4 when the ball 1 is inserted into the housing 3 as shown by arrow 25, according to embodiments of the present invention.

As the ball 1 is pushed into the socket 4, the ball 1 contacts the back-guiding surface 23 of the locking yoke 8, causing the left torsion spring 9 and the right torsion spring 10 to yield, so that the locking yoke 8 can rotate in the direction shown by arrow 20. According to such embodiments, a force applied to ball 1 and/or shaft 2 used to push the ball 1 between back-guiding surface 23 and front-guiding surface in the direction indicated by arrow 25 provides an opening force against locking yoke 8 in the direction of arrow 19. The springs 9, 10 apply a force to locking yoke 8 in the direction indicated by arrow 20; therefore, when the opening force overcomes the spring force, the locking yoke 8 will move in the direction indicated by arrow 19. As the locking yoke 8 rotates in the direction shown by arrow 19, the distance between the back-guiding surface 23 and the front-guiding surface 24 increases. When the locking yoke is rotated sufficiently far in the direction of arrow 19, the distance between the back-guiding surface 23 and the front-guiding surface 24 becomes sufficiently large for the ball 1 to enter the socket 4. When the ball 1 is fully inserted in the socket 4, locking yoke 8 automatically rotates in the direction shown by arrow 20 due to spring potential energy in left torsion spring 9 and right torsion spring 10, resulting in a closed configuration as shown in FIG. 5.

Figure 5:
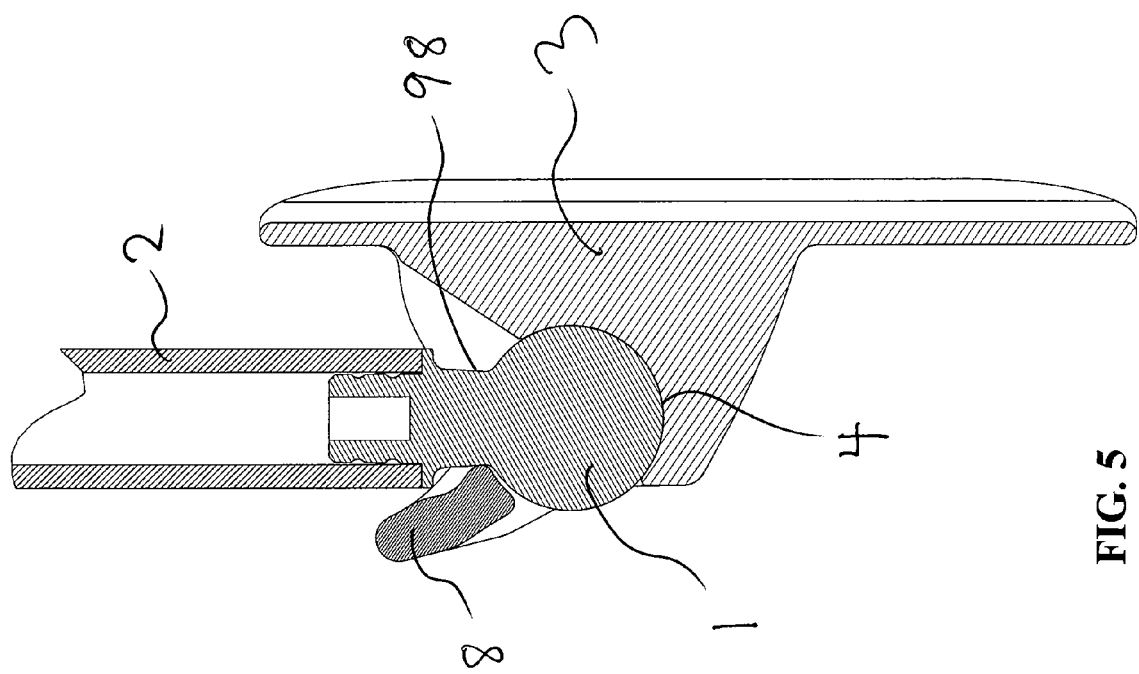
FIG. 5 is a right side cross-sectional view of the embodiment of FIGS. 1-4, taken along line A-A of FIG. 3, showing the ball fully inserted into the socket and the locking yoke capturing the ball in the socket, according to an embodiment of the present invention.

FIG. 5 illustrates a right side cross-sectional view of the latch system after insertion of the ball 1 into the socket 4 of the housing 3, according to embodiments of the present invention. The left torsion spring 9 and right torsion spring 10 have automatically rotated the locking yoke 8 into a closed position, where the locking yoke 8 captures the ball 1 within the socket 4 and prevents the ball 1 from escaping the socket 4. Thus, the latch system is self-locking after insertion of the ball 1 into the socket 4, according to embodiments of the present invention. To remove the ball 1, the locking yoke 8 is rotated to an open position as shown in FIG. 6.

Figure 6:
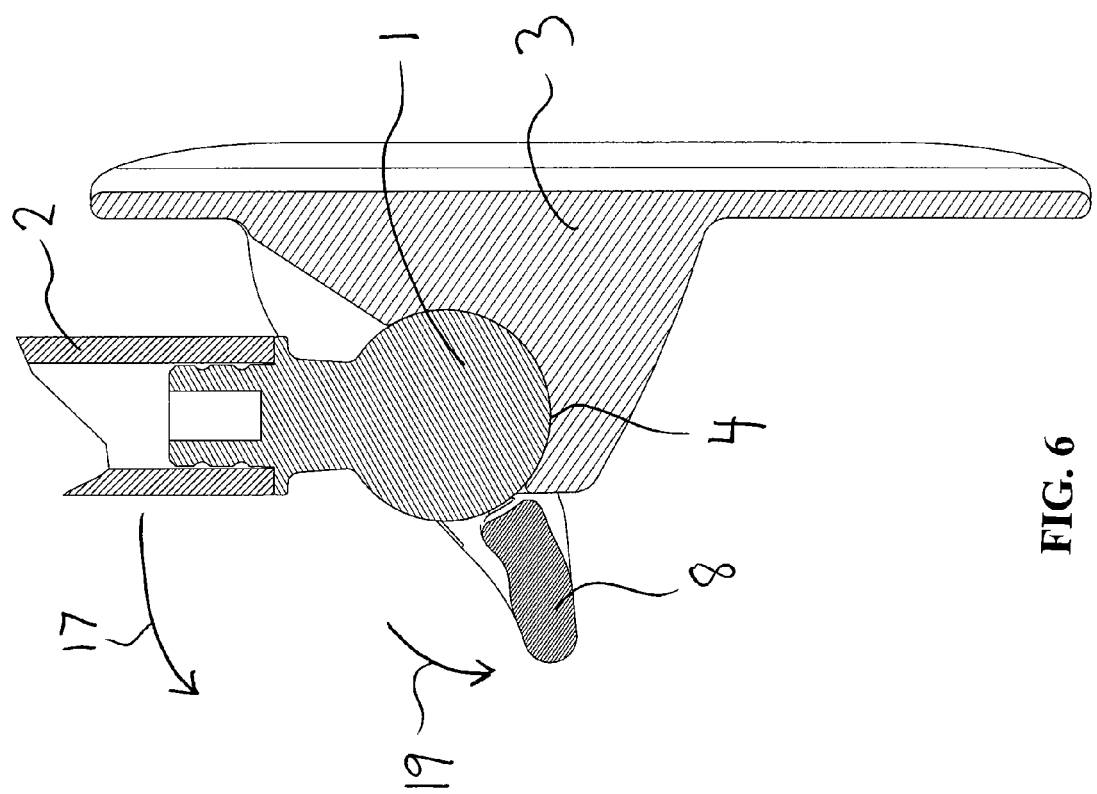
FIG. 6 is a right side cross-sectional view of the embodiment of FIGS. 1-5, taken along line A-A of FIG. 3, showing the ball fully inserted into the socket and the locking yoke rotated into an open position, according to an embodiment of the present invention.

FIG. 6 illustrates a right side cross-sectional view of the ball 1 in the socket 4 of the housing 3, according to embodiments of the present invention. The locking yoke 8 has been rotated in the direction of arrow 19 so as to overcome the force of left torsion spring 9 and right torsion spring 10. With the locking yoke 8 in an open position as shown, the ball 1 is free to escape the socket 4 of the housing 3. The user of the latch system can quickly and easily rotate the locking yoke 8 into an open position as shown in FIG. 6 by manually pressing upon the locking yoke 8 in the direction of arrow 19.

Figure 7:
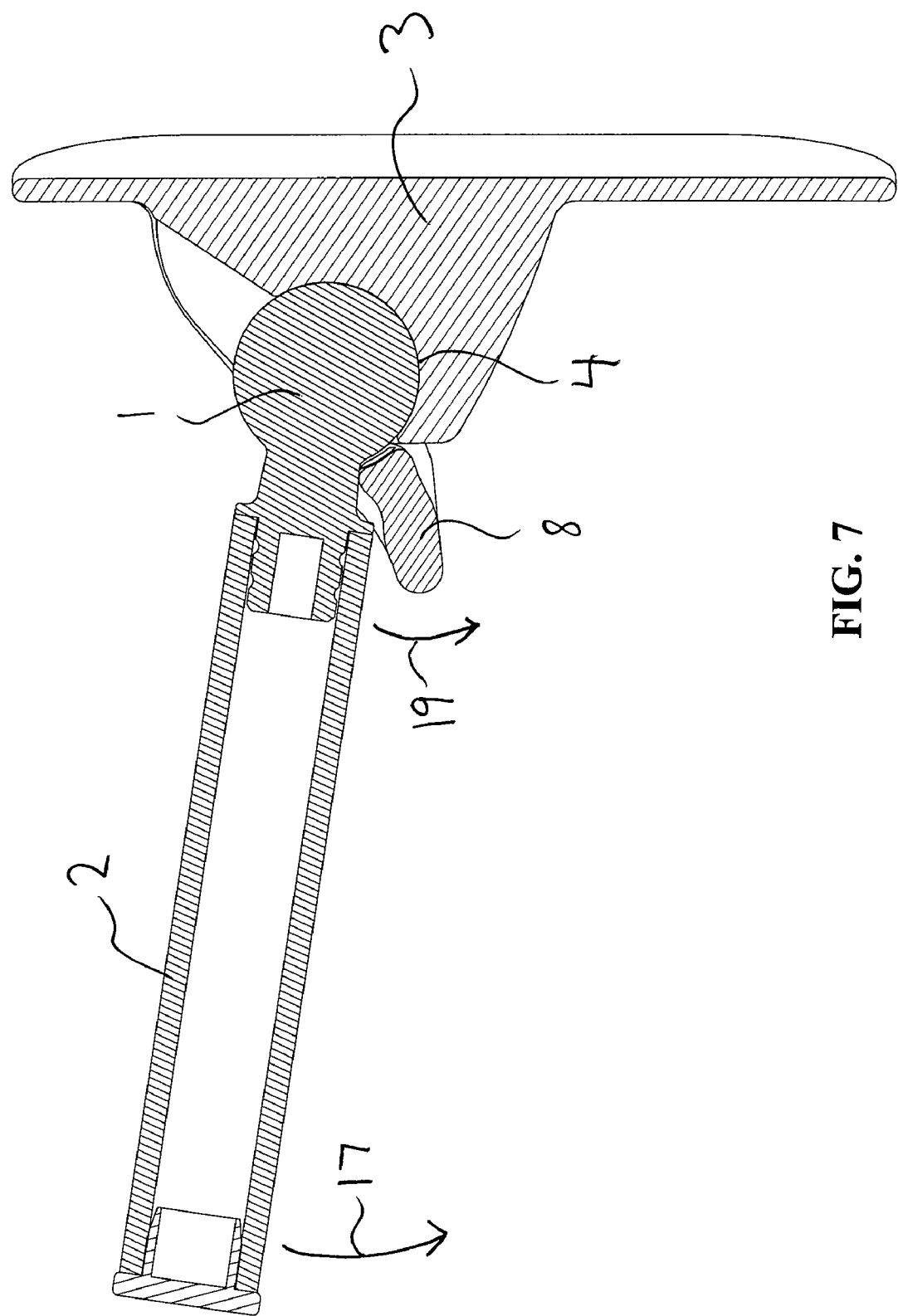
FIG. 7 is a right side cross-sectional view of the embodiment of FIGS. 1-6, taken along line A-A of FIG. 3, showing the ball fully inserted into the socket and the ball-and-shaft assembly having rotated the locking yoke into an open position, according to an embodiment of the present invention.

FIG. 7 is similar to FIG. 6, except that ball 1 and shaft 2 have been rotated in the direction of arrow 17, and the locking yoke 8 has thereby been rotated into an open position so that the ball 1 can escape the socket 4. This configuration can occur in at least two ways: the user of the latch system can manually rotate the ball 1 and shaft 2 assembly so that the shaft 2 contacts the locking yoke 8 and rotates it in the direction of arrow 19; or gravity can act upon the shaft 2 or any object attached to the shaft 2 such that when the shaft 2 or the object falls, the shaft 2 rotates the locking yoke 8 in the direction of arrow 19 without manual intervention of the user.

Figure 8:
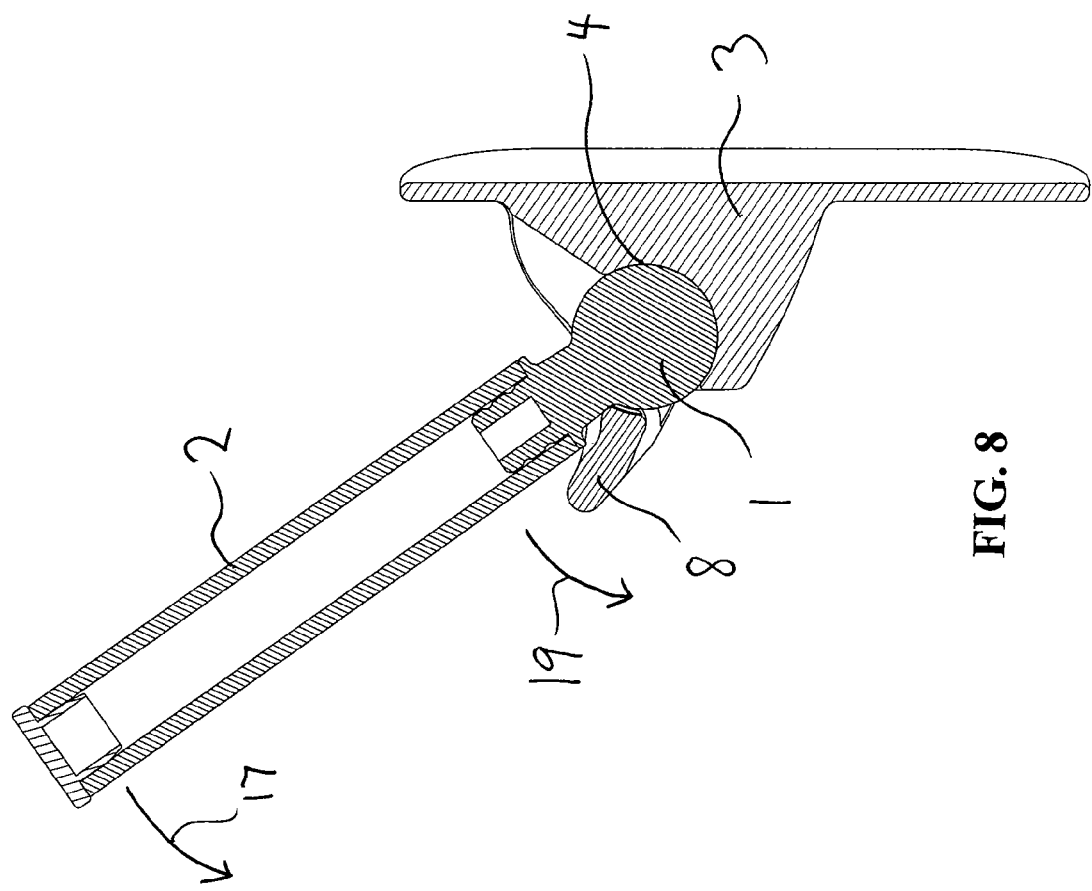
FIG. 8 is a right side cross-sectional view of the embodiment of FIGS. 1-7, taken along line A-A of FIG. 3, showing the ball fully inserted into the socket and the ball-and-shaft assembly having partially rotated the locking yoke toward an open position, such that the locking yoke is still capturing the ball in the socket, according to an embodiment of the present invention.

FIGS. 2 through 7 show the locking yoke 8 in either a fully closed position (FIGS. 2, 3, 4, and 5) or a fully open position (FIGS. 6 and 6A). FIG. 8 shows the locking yoke 8 in an intermediate position between the fully closed position and the fully open position. In this intermediate position, the locking yoke 8 still captures the ball 1 and prevents it from escaping the socket 4, because the distance between the back-guiding surface 23 and the front-guiding surface 24 is not large enough to allow the ball 1 to escape the socket 4; as such, although FIG. 8 does not depict the locking yoke 8 in the fully closed position, FIG. 8 does depict the locking yoke 8 in one of the closed positions because the locking yoke 8 of FIG. 8 captures the ball 1 within the socket 4. In order for the ball 1 to escape the socket 4, the locking yoke 8 must be rotated further in the direction of arrow 19 to a more fully open position such as is shown in FIGS. 6 and 7. Because the locking yoke 8 can capture the ball 1 in the socket 4 even when the locking yoke 8 is partially rotated toward an open position, the ball 1 and shaft 2 can rotate in the direction of arrow 17 (and in other directions, not shown) within a certain range without causing the ball 1 to release from the socket 4. Thus, the latch system provides the freedom-of-movement benefits of a ball-and-socket joint, while also including the self-locking, quick-releasing, and self-releasing functions described above.

Figure 9:
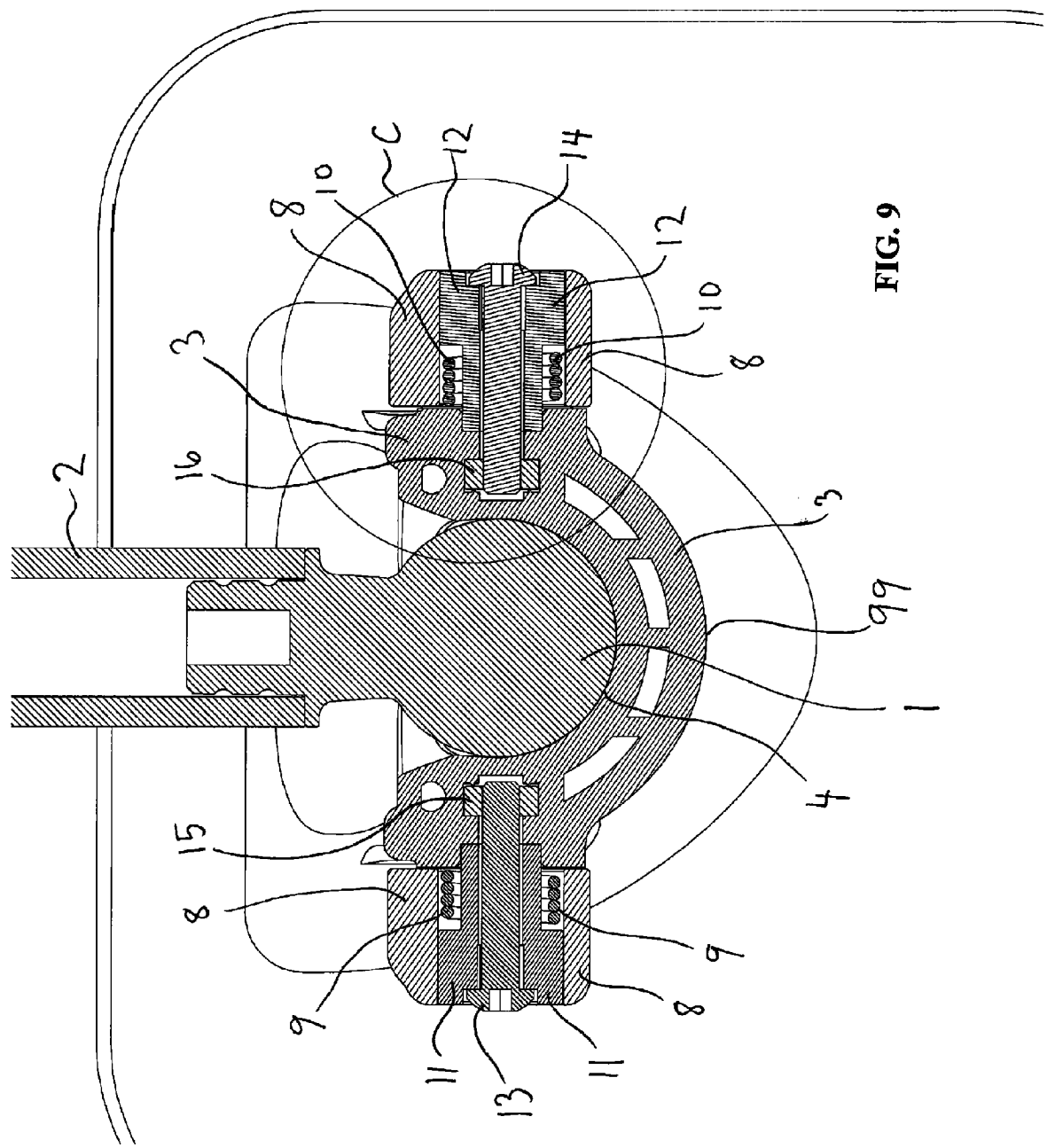
FIG. 9 is a front cross-sectional view of the embodiment of FIGS. 1-8, taken along line B-B of FIG. 2, including a vertical cross-section through the axis of the locking yoke assembly in accordance with the embodiment shown in FIG. 1.

FIG. 9. is a frontal view of an embodiment of the present invention including a vertical cross-section taken along line B-B of FIG. 2 through the axis of the locking yoke assembly 7, according to embodiments of the present invention. This view shows the ball 1 fully inserted into the socket 4 of the housing 3. Also visible are the locking yoke 8, the left axle 11 and right axle 12, the left bolt 13 and right bolt 14, the left torsion spring 9 and right torsion spring 10, and the left nut 15 and right nut 16.

Figure 10:
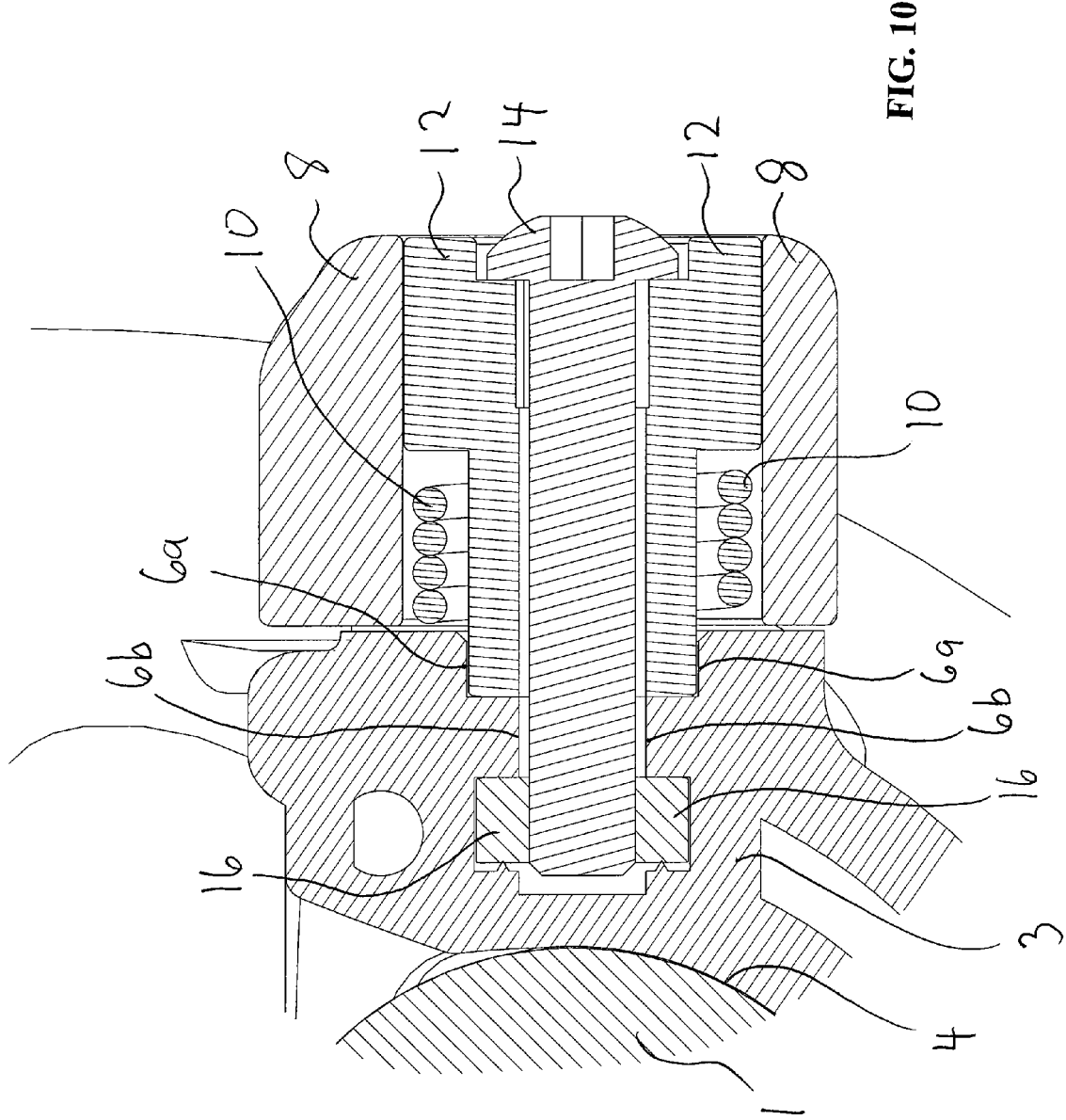
FIG. 10 is an enlarged cross-sectional view of the right side of the locking yoke assembly of FIG. 9, taken within circle C of FIG. 9, according to an embodiment of the present invention.

FIG. 10 is an enlarged view of a vertical cross-section through the axis of rotation of the right side of the locking yoke assembly 7. Again, the ball 1 is fully inserted into the socket 4 of the housing 3. The right torsion spring 10 is positioned to the inside of the locking yoke 8 and to the outside of the right axle 12. According to some embodiments of the present invention, the right torsion spring 10 may be positioned inside the locking yoke 8 prior to placing the locking yoke 8 on the housing 3, as shown in FIG. 1. The right axle 12 may be positioned inside the locking yoke 8 and inside the right torsion spring 10, and is inserted into a first aperture 6a in the housing 3. The right bolt 14 is then inserted through the central bore in the right axle 12, through a second aperture 8 in the housing 3, and then into the right nut 16 by means of conventional threads. The right nut 16 may be placed in position in the housing 3 through a formed channel (not shown) in the back side of the housing 3, according to embodiments of the present invention.

When the right bolt 14 is threaded and tightened sufficiently into the right nut 16 as shown, the right axle 12 is firmly held in position in the first aperture 6a of the housing 3, as shown. The right axle 12 then functions as a rigid axle about which the locking yoke 8 rotates as described above. The right torsion spring 10 and left torsion spring 9 bias the locking yoke 8 toward a closed position, as described above.

Figure 11:
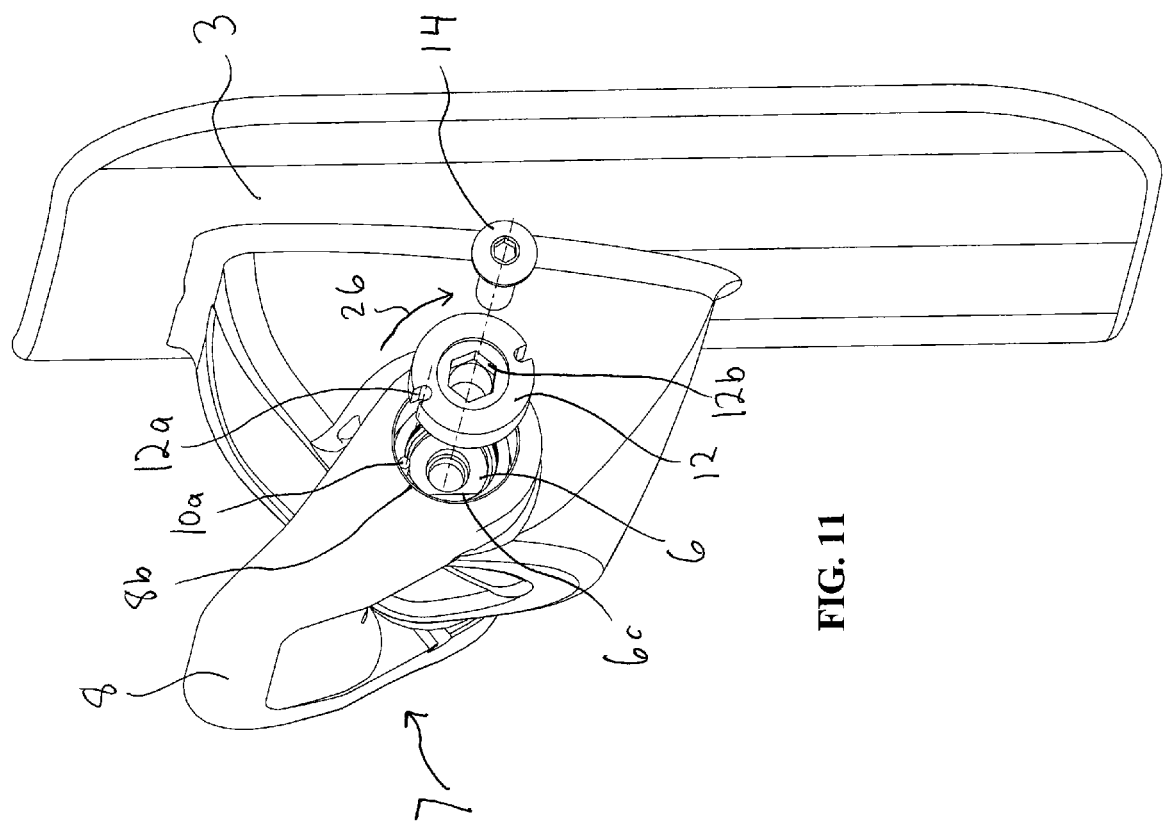
FIG. 11 is a partially exploded side perspective view of the embodiment of FIGS. 1-10, showing additional details of the locking yoke, according to an embodiment of the present invention.

FIG. 11 is a right side partially exploded perspective view of the housing 3 and locking yoke assembly 7. The locking yoke 8 is positioned with its right hollow end 8b axially aligned with the right apertures 6 in the housing 3. The outer arm 10a of right torsion spring 10 is axially aligned with the upper slot 12a of the right axle 12. The right bolt 14 is axially aligned with the right axle 12 and with the right apertures 6. A "D"-forming flatted protrusion 6c forms a part of the right apertures 6.

Figure 12:
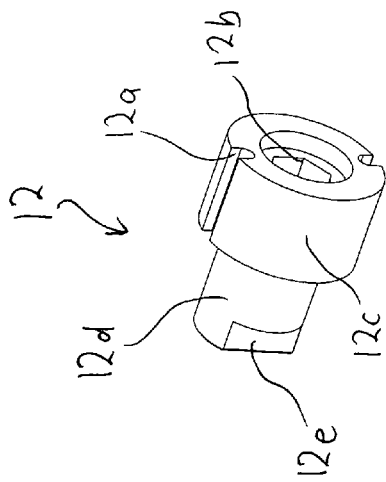
FIG. 12 is an enlarged perspective view of a right axle, according to an embodiment of the present invention.

As illustrated by FIG. 12, right axle 12 has a larger cylindrical region 12c and a smaller cylindrical region 12d, according to embodiments of the present invention. A "D"-forming flatted cutaway 12e is formed in the smaller cylindrical region 12d. The "D"-forming flatted cutaway 12e shown in FIG. 12 mates with the "D"-forming flatted protrusion 6c in the right apertures 6 shown in FIG. 11, according to embodiments of the present invention, in order to further prevent right axle 12 from rotating within aperture 6.

Referring still to FIGS. 11 and 12, the right axle 12 may be installed in its operating position by: (1) inserting a hex wrench into the hexagonal hole 12b in the right axle 12; (2) using the hex wrench to insert the right axle 12 into the right hollow end 8b of the locking yoke 8; (3) simultaneously using the hex wrench to position the upper slot 12a of the right axle 12 over the outer arm 10a of right torsion spring 10; (4) using the hex wrench to axially rotate the right axle 12 in the direction shown by arrow 26 until the "D"-forming flatted cutaway 12e is aligned with the "D"-forming flatted protrusion 6c in the right apertures 6; and (5) inserting the right axle 12 to its full depth in the right apertures 6, according to embodiments of the present invention. The right bolt 14 is then inserted through the right axle 12 and through the right apertures 6, and the right bolt is threaded tightly into the right nut 16 to firmly anchor the right axle 12 within the right apertures 6, according to embodiments of the present invention.

In the process of installing the right axle 12 as described, the right torsion spring 10 may be pre-loaded to bias the locking yoke 8 toward a closed position. This occurs in some embodiments because the upper slot 12a of the right axle 12 is placed over the outer arm 10a of right torsion spring 10 before the "D"-forming flatted cutaway 12e is aligned with the "D"-forming flatted protrusion 6c in the right apertures 6. In order to align the "D"-forming flatted cutaway 12e with the "D"-forming flatted protrusion 6c, the right axle 12 is rotated axially in the direction shown by arrow 26. During this rotation, the inner arm 10a of the right torsion spring 10 is held in place in the right slot 8d of the locking yoke 8, as shown in FIGS. 1 and 3. Because the inner arm 10a is fixed in position, the rotation of the outer arm 10a in the direction shown by arrow 26 pre-loads the right torsion spring 10. The right torsion spring 10 is designed so that the desired pre-load is reached when the "D"-forming flatted cutaway 12e is aligned with the "D"-forming flatted protrusion and the right axle 12 is fully inserted into the right apertures 6, according to embodiments of the present invention. The right axle 12 is then prevented from any further rotation—thus maintaining the desired pre-load of the right torsion spring 10—by the matching surfaces of the "D"-forming flatted cutaway 12e and the "D"-forming flatted protrusion, and by the compressive forces exerted by the right bolt 14 and right nut 16. According to such embodiments of the present invention, the locking yoke 8 is biased toward a closed position.

As used herein, the term "bias" is used in its broadest sense to refer to the use of any force (other than manual force applied by the user of the latch system) to urge the locking yoke 8 in a particular direction or orientation. Based on the disclosure provided herein, one of ordinary skill in the art will appreciate the many different ways in which the locking yoke 8 may be biased toward a closed position. For example, a torsion spring, compression spring, tension spring, elastic cord, and/or elastic band may be coupled to the locking yoke 8 to bias it toward the socket 4 or socket housing 3. Gravity, electromagnetism, compressed gasses, and myriad other sources of force may also be applied to the locking yoke 8 to bias it toward a closed position, according to embodiments of the present invention.

For clarity and simplicity, FIGS. 10, 11, and 12 show only the right side of the locking yoke assembly 7. Based on the disclosure provided herein, one of ordinary skill in the art will recognize that the left side of the locking yoke assembly 7 may be a mirror image of the right side and function identically, according to embodiments of the present invention.

It will be readily apparent to one skilled in the art that in different embodiments of the present invention the locking yoke 8 may be rotationally coupled to the socket 4 in myriad different ways. By way of example, but not limitation, in some embodiments, the nuts 15, 16 and bolts 13, 14 described above may be replaced with other types of fasteners to secure an axle 11, 12 to a socket 4 or housing 3 or otherwise to couple a locking yoke 8 to a socket 4 or housing 3. Moreover, the heads of any fasteners are not required to have hexagonal bores, but rather can be of any shape or type (e.g., slotted head, phillips head, round head, etc.). And in some embodiments, the locking yoke 8 may be rotationally coupled to the socket 4 without the use of any separate axles or fasteners; for example, the locking yoke 8 may be formed with one or more integral axle-like protrusions that lie within mating cylindrical holes in the socket 4 or the housing 3.

A variety of "mating elements" could be formed on socket 4 and axle 11, 12 in order to achieve a similar indexing and preloading function. As yet a further example, a multitude of non-round mating elements other than the "D" shape shown above could be used to index the position of the left axle 11 and right axle 12 and to prevent them from rotating within the housing 3, according to embodiments of the present invention. For example, a pair of mating elements formed on the axle and the socket may be implemented to form an S-shaped mating line, according to embodiments of the present invention.

While embodiments of the present invention shown above are depicted in an "upright" spatial orientation in which the force of gravity upon the shaft 2 or any object attached to the shaft 2 may tend to rotate the shaft 2 toward the locking yoke 8 and thereby rotate the locking yoke 8 into an open position, embodiments of the present invention may be deployed in any number of different spatial orientations. In some orientations, some embodiments would not be self-releasing by means of gravity, but such embodiments may nevertheless retain self-locking and quick-releasing functions. The drawings in this specification depict various embodiments of the present invention in certain spatial orientations for clarity of illustration, but this is not intended to be limiting in nature. The embodiments of the present invention can be deployed in any spatial orientation without affecting the underlying geometry or mechanics of ball-and-socket capture and release. However, the effect of gravitational forces upon any particular embodiment will obviously depend upon spatial orientation; and accordingly, embodiments that comprise a gravitational self-release function are preferably be oriented appropriately to take advantage of such a function.

For example, if the embodiment of FIGS. 1-12 was rotated 180 degrees upside down, the force of gravity acting upon the shaft 2 or any object attached to the shaft 2 would not cause the shaft 2 to rotate against the locking yoke 8 and therefore would not rotate the locking yoke 8 into an open position. However, the embodiment of FIGS. 1-12 would nevertheless retain its self-locking function (due to the use of torsion springs to bias the locking yoke 8 toward a closed position) and its quick-release function (through the user's manual rotation of either the locking yoke 8 or the shaft 2). The scope of the present invention is intended to embrace all potential spatial orientations in which the invention might be disposed, including those orientations in which gravity would not effectuate the release of the ball 1 from the socket 4.

FIGS. 13-19 illustrate certain geometric principles involved in releasable ball-and-socket latch mechanisms and illustrate different embodiments of the present invention that utilize these geometric principles. As used herein, the term "sphere" is used to refer to a three-dimensional surface comprising all points that are equidistant from a center point, and which does not include points that are interior to the surface of the sphere. As used herein, the term "hemisphere" is used to refer to an exact half-sphere. As used herein, the term "merosphere" is used to refer to a portion of a sphere lying entirely within one hemisphere. As used herein, the term "co-hemispheric" is used to refer to a set of points lying entirely within any one hemisphere.

Figure 13:
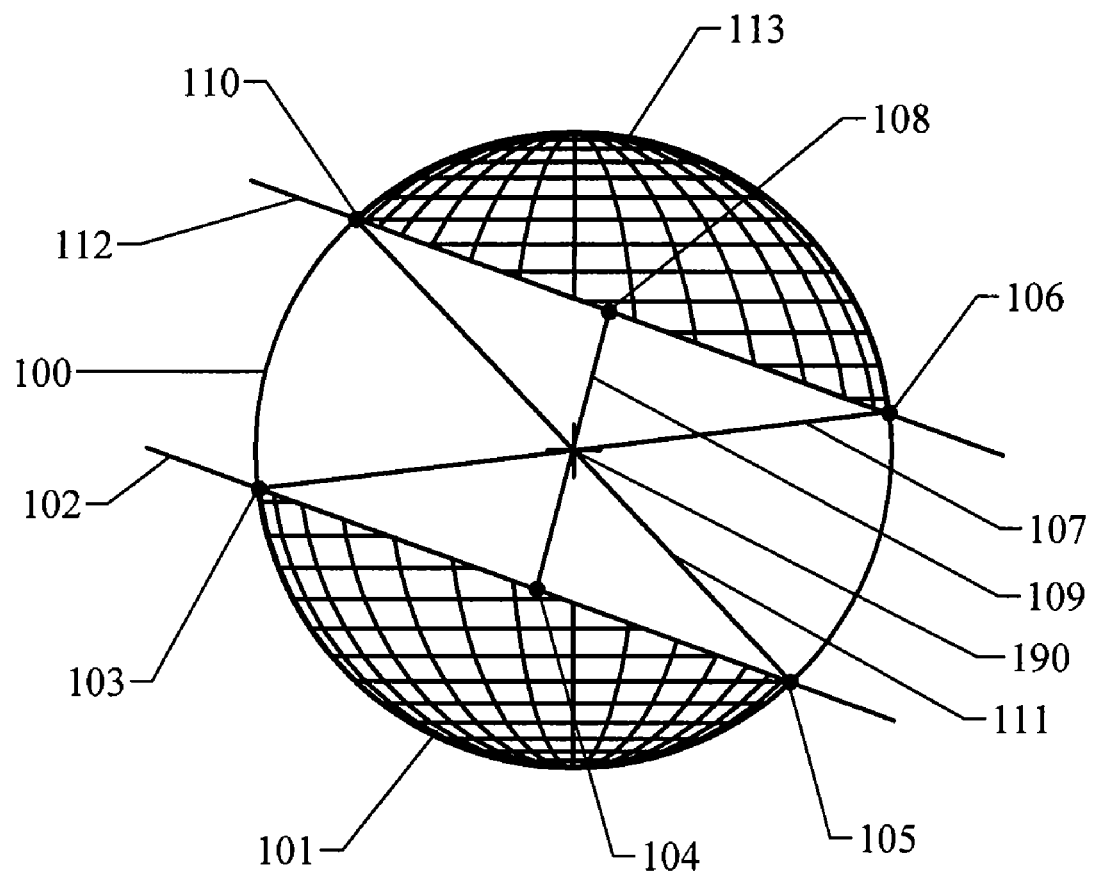
FIG. 13 illustrates a side view of an exemplary sphere geometry and socket contact surface, according to embodiments of the present invention.

FIG. 13 shows a side view of a sphere 100 and a merospheric socket surface 101. The sphere 100 represents a solid ball 1 and the socket surface 101 represents the ball-contact surface of a solid socket 4, according to embodiments of the present invention.

According to some embodiments of the present invention, the sphere 100 and socket surface 101 have the same radius. The socket surface 101 lies upon that portion of the sphere 100 located at and below the intersection of the sphere 100 and a socket plane 102. First socket point 103, second socket point 104, and third socket point 105 lie upon the socket plane 102 and the socket surface 101. The socket surface 101 has an infinite number of other points that are not specifically labeled in FIG. 13.

First antipodal point 106 is antipodal to first socket point 103. First projection line 107 extends from first socket point 103, through the center 190 of the sphere 100, to first antipodal point 106. Second antipodal point 108 is antipodal to second socket point 104. Second projection line 109 extends from second socket point 104, through the center 190 of the sphere 100, to second antipodal point 108. Third antipodal point 110 is antipodal to third socket point 105. Third projection line 111 extends from third socket point 105, through the center 190 of the sphere 100, to third antipodal point 110.

First antipodal point 106, second antipodal point 108, and third antipodal point 110 lie upon a capture boundary plane 112. A merospheric capture surface 113 lies upon that portion of the surface of the sphere 100 located above the capture boundary plane 112. The capture surface 113 has an infinite number of points, none of which are specifically labeled in FIG. 13. The capture surface 113 does not include first antipodal point 106, second antipodal point 108, third antipodal point 110, or any other point lying upon the intersection of the sphere 100 and the capture boundary plane 112, because these points are co-hemispheric with every point on the socket, and geometric capture of a sphere requires at least four points of constraint that are not co-hemispheric.

The sphere 100 will be captured if it is constrained at the socket surface 101 and is also constrained at a single capture point located anywhere on the capture surface 113. The sphere 100 will be captured in these circumstances because it will be constrained at four or more points that are not co-hemispheric. Although constraining the sphere 100 at the socket surface 101 and at least one point on the capture surface 113 is a sufficient condition to capture the sphere 100, it is not a necessary condition. A set of points lying entirely outside of the capture surface 113 may be sufficient to capture the sphere 100 as long as the sphere 100 is constrained at four or more points that are not co-hemispheric. For example, constraining the sphere 100 at the socket surface 101 and at least two points lying between the socket surface 100 and the capture surface 113 will be sufficient to capture the sphere 100 if the sphere 100 is constrained at four or more points that are not co-hemispheric.

Conversely, the sphere 100 will not be captured by a single capture point 116 if it is constrained at the socket surface 101 but is not also constrained at a single capture point 116 located on the capture surface 113. The sphere 100 will not be captured in these circumstances because all points of constraint will be co-hemispheric, and the capture of a sphere requires constraint at four or more points that are not co-hemispheric.

Figure 14:
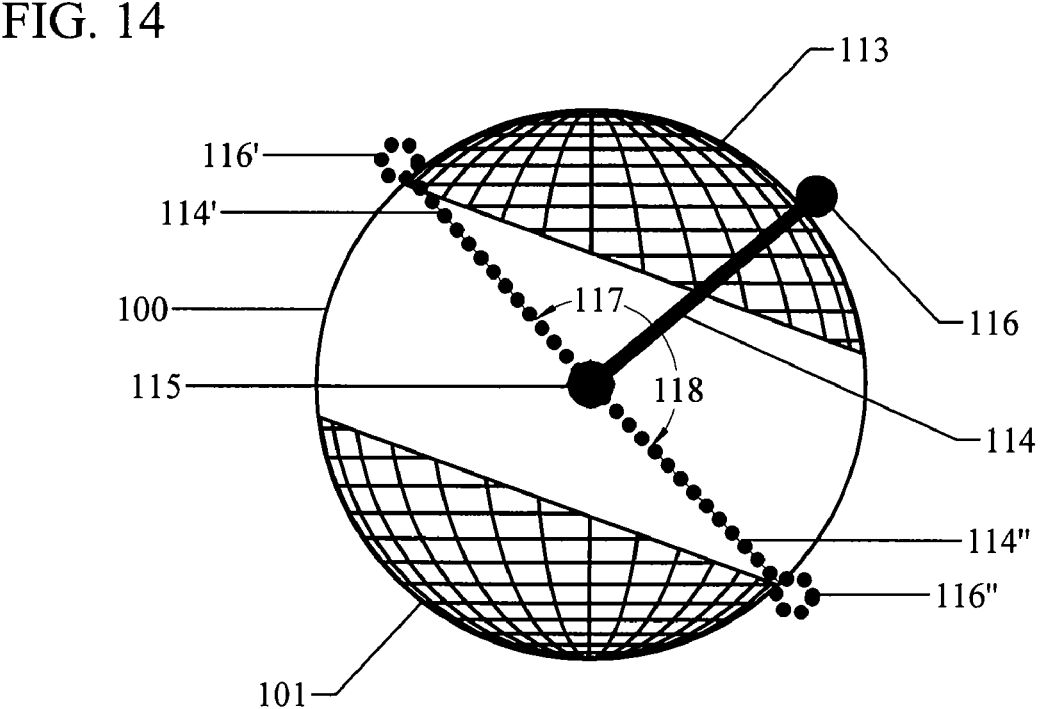
FIG. 14 illustrates a side view of the sphere of FIG. 13 with a locking yoke, taken perpendicularly to the axis of rotation of the locking yoke, according to embodiments of the present invention.

FIG. 14 shows the same sphere 100, socket surface 101, and capture surface 113 that are shown in FIG. 13. FIG. 14 also shows a simplified locking yoke 114, which represents and functions similarly to the locking yoke 8 of FIGS. 1-8 above. The view of FIG. 14 is taken perpendicularly to the axis of rotation 115 of the yoke 114, according to embodiments of the present invention.

In the embodiment of FIG. 14, locking yoke 114 has an axis of rotation 115 that passes through the center of the sphere 100. At the distal end of the locking yoke 114 there is a capture point 116 in contact with the surface of the sphere 100. The capture point 116 constrains the sphere 100 at the point of contact between them.

Locking yoke 114 can be rotated about its axis of rotation 115 in the directions shown by arrows 117 and 118. When locking yoke 114 is so rotated, capture point 116 moves in an arc along the surface of the sphere 100. In the embodiment of FIG. 14, this arc lies on a plane that bisects the sphere 100 and that is perpendicular to the axis of rotation 115 of the locking yoke 114. For example, locking yoke 114 can be rotated in the direction of arrow 117 to the position 114', such that capture point 116 moves to the position 116'. Locking yoke 114 can also be rotated in the direction of arrow 118 to the position 114", such that capture point 116 moves to the position 116". Locking yoke 114 can also be rotated to any number of intermediate positions, such that capture point 116 is in contact with any number of intermediate points on the surface of the sphere 100.

In the embodiment of FIG. 14, the sphere 100 will be captured if it is constrained at the socket surface 101 and the locking yoke 114 is rotationally positioned so that the capture point 116 lies at any point upon the capture surface 113 and constrains the sphere 100 at that point. The sphere 100 will be captured in these circumstances because it will be constrained at four or more points that are not co-hemispheric.

Conversely, the sphere 100 will not be captured if it is constrained at the socket surface 101 but the locking yoke 114 is rotationally positioned so that the capture point 116 is not in contact with the capture surface 113. The sphere 100 will not be captured in these circumstances because all points of constraint will be co-hemispheric.

FIG. 14 thus illustrates one particular geometric embodiment of the present invention. Here, as in the other embodiments, a rotating locking yoke 114 can alternately constrain and not constrain a sphere 100 (or a substantially spherical ball 1), depending upon the rotational position of the locking yoke 114 and the corresponding location of at least one capture point 116 upon the sphere 100 (or ball 1). In the embodiment of FIG. 14, the axis of rotation 115 of the locking yoke 114 passes through the center of the sphere 100, and the arc of rotation of the at least one contact point 116 lies on a plane that passes through the center of the sphere 100 and that is perpendicular to the axis of rotation 115. As is shown below, myriad other geometric configurations and embodiments of the present invention are possible.

Figure 15:
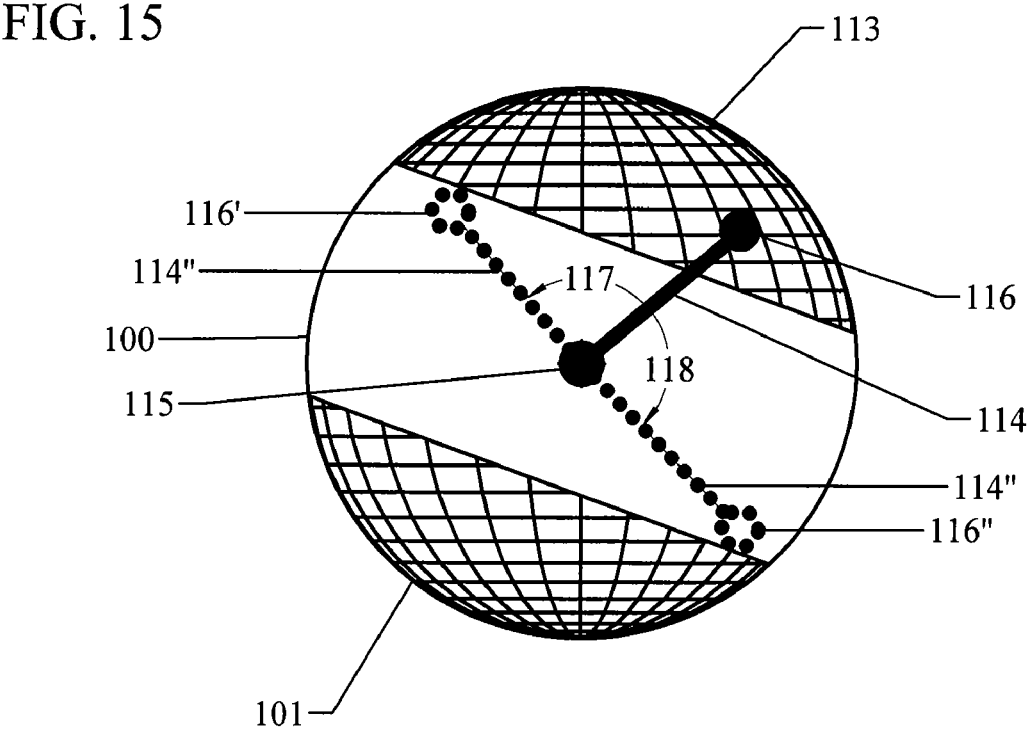
FIG. 15 illustrates a side view of the sphere of FIGS. 13 and 14 with an alternative locking yoke, taken perpendicularly to the axis of rotation of the alternative locking yoke, according to embodiments of the present invention.

FIG. 15 shows the same sphere 100, socket surface 101, and capture surface 113 that are shown in FIGS. 13 and 14. FIG. 15 also shows a simplified locking yoke 114, which represents and functions similarly to the locking yoke 8 of FIGS. 1-8 above and locking yoke 114 of FIG. 14.

In FIG. 15, as in FIG. 14, locking yoke 114 has an axis of rotation 115 that passes through the center of the sphere 100, and that is perpendicular to the plane of the view of FIG. 15. At the distal end of locking yoke 114 there is a capture point 116 in contact with the surface of the sphere 100. The capture point 116 constrains the sphere 100 at the point of contact between them.

FIG. 15 differs from FIG. 14, however, in that locking yoke 114 is shorter. When locking yoke 114 of FIG. 15 is rotated about its axis of rotation 115, capture point 116 moves in an arc on a plane that is perpendicular to the axis of rotation 115, but which does not bisect the sphere 100. The capture point 116 of FIG. 15 thus contacts and constrains the sphere 100 at a set of contact points different from the set of contact points depicted in FIG. 14.

While the arc of capture point 116 is different in FIG. 15, the function of the locking yoke 114 is essentially the same, according to embodiments of the present invention. Locking yoke 114 can be rotated in the direction of arrow 117 to the position 114', such that capture point 116 moves to the position 116'. Locking yoke 114 can also be rotated in the direction of arrow 118 to the position 114", such that capture point 116 moves to the position 116". Locking yoke 114 can also be rotated to any number of intermediate positions, such that capture point 116 is in contact with any number of intermediate points on the surface of the sphere 100.

In the embodiment of FIG. 15, as in FIG. 14, the sphere 100 will be captured if it is constrained at the socket surface 101 and the locking yoke 114 is rotationally positioned so that the capture point 116 lies at any point upon the capture surface 113 and constrains the sphere 100 at that point. The sphere 100 will be captured in these circumstances because it will be constrained at four or more points that are not co-hemispheric.

Conversely, the sphere 100 will not be captured if it is constrained at the socket surface 101 but the locking yoke 114 is rotationally positioned so that the capture point 116 is not in contact with the capture surface 113. The sphere 100 will not be captured in these circumstances because all points of constraint will be co-hemispheric.

Figure 16:
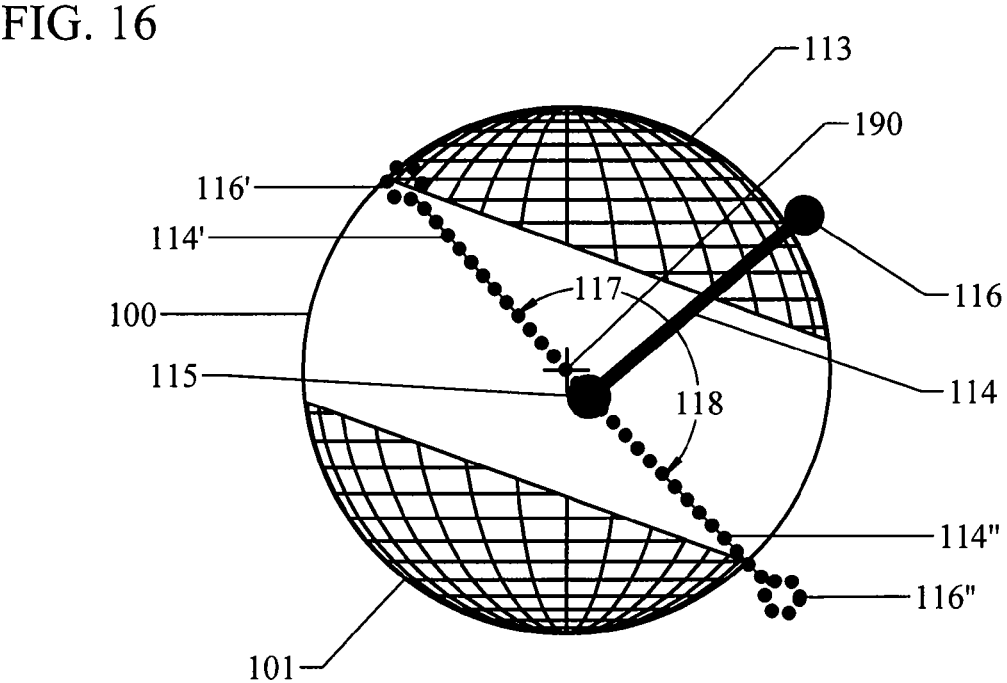
FIG. 16 illustrates a side view of the sphere of FIGS. 13-15 with the locking yoke of FIG. 14 and an alternative locking yoke placement, taken perpendicularly to the axis of rotation of the locking yoke, according to embodiments of the present invention.

FIG. 16 shows the same sphere 100, socket surface 101, and capture surface 113 that are shown in FIGS. 13, 14, and 15. FIG. 16 also shows a simplified locking yoke 114, which represents and functions similarly to the locking yoke 8 of FIGS. 1-8 above and locking yoke 114 of FIGS. 14 and 15.

In FIG. 16, the locking yoke 114 is the same length as the locking yoke 114 of FIG. 14. In FIG. 16, as in FIG. 14, the distal end of locking yoke 114 has a capture point 116 in contact with the surface of the sphere 100. The capture point 116 constrains the sphere 100 at the point of contact between them.

FIG. 16 differs from FIG. 14, however, in that the axis of rotation 115 of the locking yoke 114 does not pass through the center 190 of the sphere 100. In the embodiment of FIG. 12, the axis of rotation 115 is offset slightly down and to the right of the center of the sphere 100 from the point of view of FIG. 12. In the embodiment of FIG. 16, when locking yoke 114 is rotated about its axis of rotation 115, capture point 116 moves in an arc that does not follow the surface of the sphere 100. Rather, in the embodiment of FIG. 12 the rotation of the locking yoke 114 about its axis of rotation 115 causes the capture point 116 to move closer to or farther away from the sphere 100, and in some cases causes the capture point 116 to impinge upon the sphere 100.

For example, when the locking yoke 114 of FIG. 16 is rotated in the direction of arrow 118 to the position 114", capture point 116 moves to the position 116". In this position 116", capture point 116 is not in contact with and does not capture or constrain the sphere 100. When locking yoke 114 is rotated in the direction of arrow 117 to the position 114', capture point 116 moves to the position 116'. In this position 116', capture point 116 impinges upon the sphere (creating an interference condition when solid objects are attempted to be disposed in this configuration). In an intermediate position—shown by solid line locking yoke 114 and capture point 116 in FIG. 16—the capture point 116 is in contact with the sphere 100 at a point on the capture surface 113. In this position of locking yoke 114 and capture point 116, the sphere 100 is captured because it is constrained at four or more points that are not co-hemispheric.

In FIG. 16, the arc of capture point 16 is different than in FIG. 14 due to the off-center location of the axis of rotation 115, but the function of the locking yoke 114 is essentially the same, according to embodiments of the present invention. In FIG. 16, as in other embodiments of the present invention, locking yoke 114 can be rotated to alternate positions, so that the sphere 100 is alternately captured or released. The sphere 100 will be captured if it is constrained at four or more points that are not co-hemispheric. The sphere 100 will not be captured if all points of constraint are co-hemispheric.

Locating the axis of rotation 115 of the yoke 114 off-center with respect to the center of the sphere 100 provides some advantages according to embodiments of the present invention. For example, manufacturing tolerances may prevent the precision needed to create a perfect sphere which would allow the capture point 116 of locking yoke 114 of FIG. 14 to actually travel in an arc along the surface of the sphere 100. The configuration of FIG. 16, on the other hand, permits the capture point 116 to contact the capture surface 113 where needed in a closed position 116, and to be moved away from the surface of the sphere 100 in an open position 116". Locating the axis of rotation 115 of the locking yoke 114 off-center slightly as shown in FIG. 16 (such as, for example, locating the axis of rotation 95 of the embodiments of FIGS. 2 and 3 slightly off center as shown in FIG. 16) also minimizes or eliminates rattle of the ball 1 within the socket 4 during use, due to the constant contact between the socket 4 on one side and the at least one contact point 116 when the locking yoke 114 is biased toward a closed position, according to embodiments of the present invention.

Figure 17:
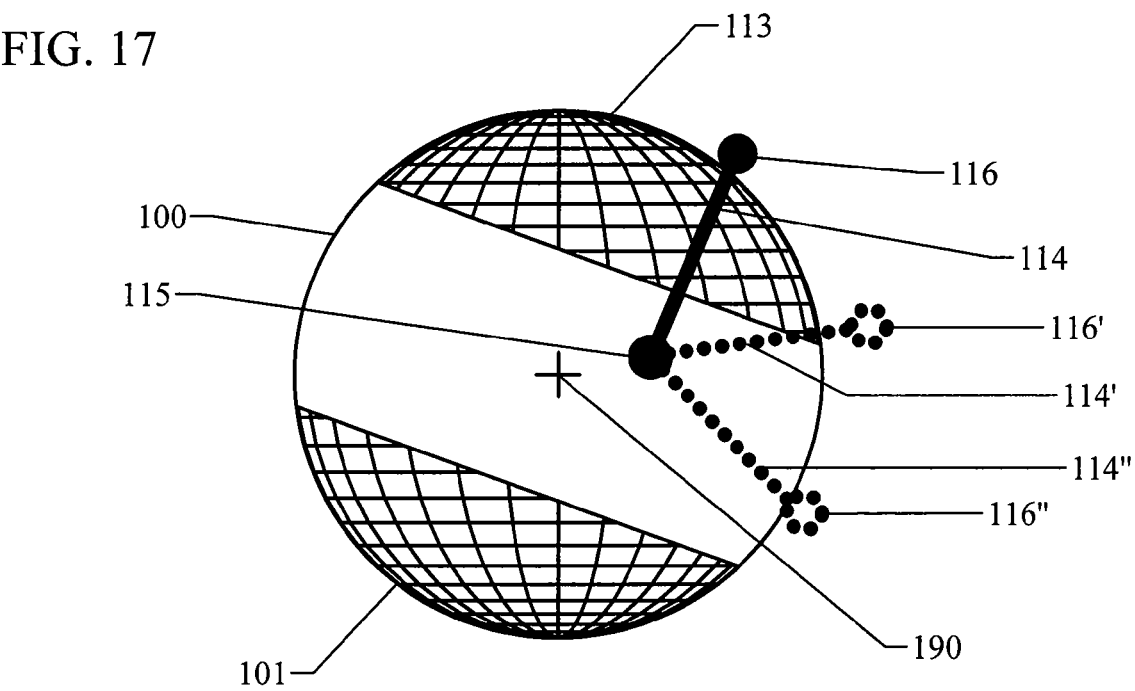
FIG. 17 illustrates a side view of the sphere of FIGS. 13-16 with the alternative locking yoke of FIG. 15 and yet another alternative locking yoke placement, taken perpendicularly to the axis of rotation of the alternative locking yoke, according to embodiments of the present invention.

FIG. 17 shows the same sphere 100, socket surface 101, and capture surface 113 that are shown in FIGS. 13-16. FIG. 17 also shows a simplified locking yoke 114, which represents and functions similarly to the locking yoke 8 of FIGS. 1-8 above and locking yoke 114 of FIGS. 14, 15, and 16. In FIG. 17, the locking yoke 114 is the same length as the locking yoke 114 of FIG. 15. In FIG. 17, as in FIG. 15, the distal end of locking yoke 114 has a capture point 116 in contact with the surface of the sphere 100. The capture point 116 constrains the sphere 100 at the point of contact between them.

FIG. 17 differs from FIG. 15, however, in that the axis of rotation 115 of the locking yoke 114 does not pass through the center 190 of the sphere 100. In the embodiment of FIG. 17, the axis of rotation 115 is offset up and to the right of the center 190 of the sphere 100 from the point of view of FIG. 17. In the embodiment of FIG. 17, when locking yoke 114 is rotated about its axis of rotation 115, capture point 116 moves in an arc that does not follow the surface of the sphere 100. Rather, in the embodiment of FIG. 17 the rotation of the locking yoke 114 about its axis of rotation 115 causes the capture point 116 to move closer to or farther away from the sphere 100, and in some cases may cause the capture point 116 to impinge upon the sphere 100 to create an interference condition (not shown).

For example, when the locking yoke 114 of FIG. 17 is rotated to the position 114", capture point 116 moves to the position 116". In this position 116", capture point 116 is in contact with and constrains the sphere 100, but the sphere 100 is not captured because the capture point 116 does not lie upon the capture surface 113. When locking yoke 114 is rotated to the position 114', capture point 116 moves to the position 116'. In this position 116', capture point 116 lies near the capture surface 113, but capture point 116 does not contact, constrain, or capture the sphere 100. When locking yoke 114 is rotated to the position shown by solid line locking yoke 114 in FIG. 12A, the capture point 116 is in contact with the sphere 100 at a point on the capture surface 113. In this position of locking yoke 114 and capture point 116, the sphere 100 is captured because it is constrained at four or more points that are not co-hemispheric.

In FIG. 17, the arc of capture point 116 is different than in FIGS. 14, 15, and 16 due to the combination of a shorter locking yoke 114 and off-center location of the axis of rotation 115, but function of the locking yoke 114 is essentially the same, according to embodiments of the present invention. In FIG. 17, as in other embodiments of the present invention, locking yoke 114 can be rotated to alternate positions, so that the sphere 100 is alternately captured or released. The sphere 100 will be captured if it is constrained at four or more points that are not co-hemispheric. The sphere 100 will be released if all points of constraint are co-hemispheric.

Figure 18:
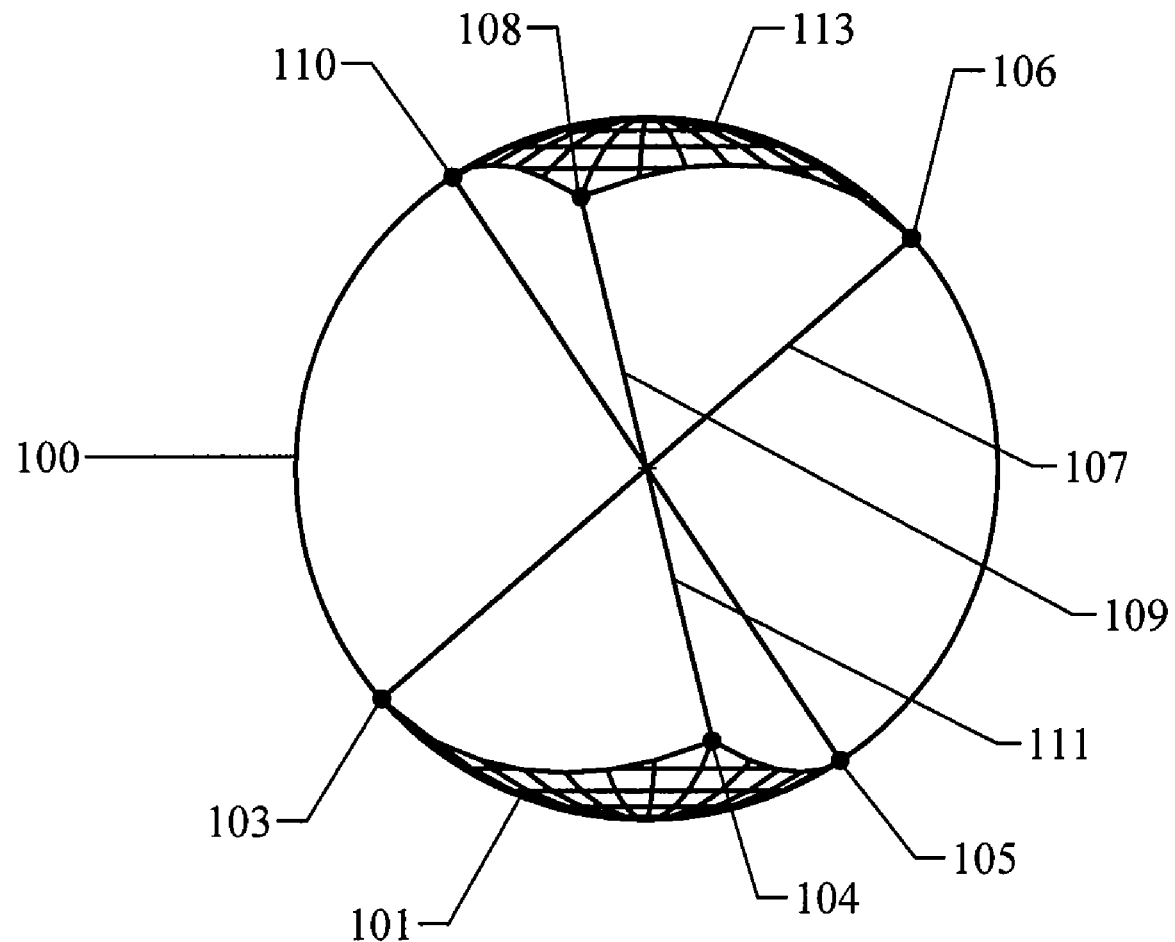
FIG. 18 illustrates a side view of an exemplary sphere geometry and socket contact surface, according to embodiments of the present invention.

FIG. 18 shows a different geometric embodiment of the present invention. FIG. 18 includes a sphere 100 representing a ball 1, according to embodiments of the present invention. First socket point 103, second socket point 104, and third socket point 105 lie upon and constrain the sphere 100. A merospheric socket surface 101 lies on and between the geodesic lines connecting first socket point 103, second socket point 104, and third socket point 105. The socket surface 101 has an infinite number of other points that are not specifically labeled in FIG. 18. The sphere 100 and socket surface 101 have the same radius.

First antipodal point 106 is antipodal to first socket point 103. First projection line 107 extends from first socket point 103, through the center 190 of the sphere 100, to first antipodal point 106. Second antipodal point 108 is antipodal to second socket point 104. Second projection line 109 extends from second socket point 104, through the center 190 of the sphere 100, to second antipodal point 108. Third antipodal point 110 is antipodal to third socket point 105. Third projection line 111 extends from third socket point 105, through the center 190 of the sphere 100, to third antipodal point 110.

In FIG. 18, a merospheric capture surface 113 lies on that portion of the sphere located between the geodesic lines connecting first antipodal point 106, second antipodal point 108, and third antipodal point 110. The capture surface 113 has an infinite number of points, none of which are specifically labeled in FIG. 18. The capture surface 113 does not include first antipodal point 106, second antipodal point 108, third antipodal point 110, or the geodesic lines connecting these points, because these points and lines are co-hemispheric with every point on the socket surface 101, and capture of a sphere requires at least four points of constraint that are not co-hemispheric.

In the embodiment of FIG. 18, the sphere 100 will be captured if it is constrained at the socket surface 101 and is also constrained at a single point located on the capture surface 113. The sphere 100 will also be captured if it is constrained only at first socket point 103, second socket point 104, third socket point 105, and a single capture point located anywhere on the capture surface 113. The sphere 100 will be captured in these circumstances because it will be constrained at four or more points that are not co-hemispheric. Although constraining the sphere 100 at the socket surface 101 and at least one point on the capture surface 113 is a sufficient condition to capture the sphere 100, it is not a necessary condition. A set of points lying entirely outside of the capture surface 113 may be sufficient to capture the sphere 100 as long as the sphere 100 is constrained at four or more points that are not co-hemispheric. For example, constraining the sphere 100 at the socket surface 101 and at least two points lying between the socket surface 100 and the capture surface 113 will be sufficient to capture the sphere 100 if the sphere 100 is constrained at four or more points that are not co-hemispheric.

Conversely, the sphere 100 will not be captured by a single capture point 116 if it is constrained at the socket surface 101 or at first socket point 103, second socket point 104, and third socket point 105, but is not also constrained at a single capture point 116 located on the capture surface 113. The sphere 100 will not be captured in these circumstances because all points of constraint will be co-hemispheric.

Figure 19:
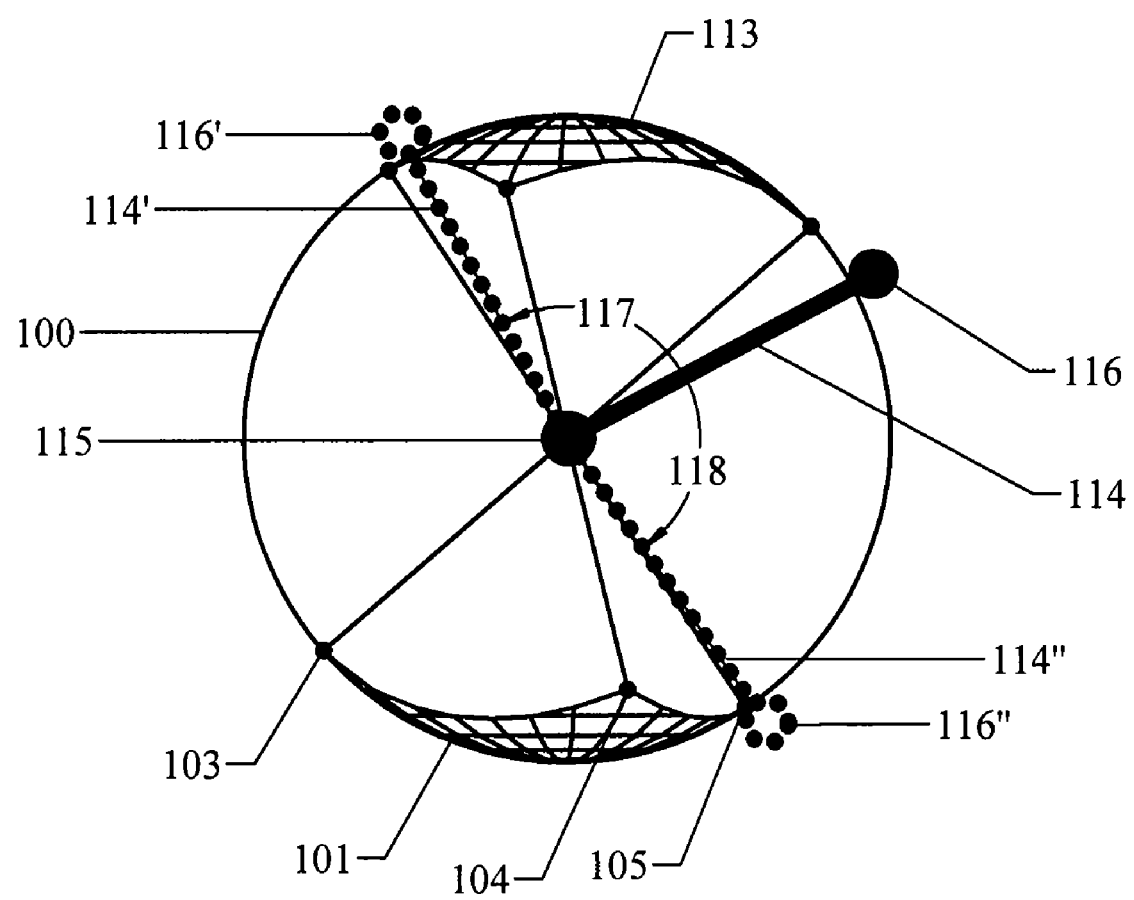
FIG. 19 illustrates a side view of the sphere of FIG. 18 with a locking yoke, taken perpendicularly to the axis of rotation of the locking yoke, according to embodiments of the present invention.

FIG. 19 shows the same sphere 100, socket surface 101, and capture surface 113 that are shown in FIG. 18. FIG. 19 also shows a simplified locking yoke 114, which represents and functions similarly to the locking yoke 8 of FIGS. 1-8 and locking yoke 114 of FIGS. 14-17 above. In the embodiment of FIG. 19, locking yoke 114 has an axis of rotation 115 that passes through the center of the sphere 100, and that is perpendicular to the plane of the view of FIG. 19. At the distal end of the locking yoke 114 there is a capture point 116 in contact with the surface of the sphere 100. The capture point 116 constrains the sphere 100 at the point of contact between them.

Locking yoke 114 can be rotated about its axis of rotation 115 in the directions shown by arrows 117 and 118. When locking yoke 114 is so rotated, capture point 116 moves in an arc along the surface of the sphere 100. In the embodiment of FIG. 19, this arc lies on a plane that bisects the sphere 100 and that is perpendicular to the axis of rotation 115 of the locking yoke 114. For example, locking yoke 114 can be rotated in the direction of arrow 117 to the position 114', such that capture point 116 moves to the position 116'. Locking yoke 114 can also be rotated in the direction of arrow 118 to the position 114", such that capture point 116 moves to the position 116". Locking yoke 114 can also be rotated to any number of intermediate positions, such that capture point 116 is in contact with any number of intermediate points on the surface of the sphere 100.

In the embodiment of FIG. 19, the sphere 100 will be captured if it is constrained at the socket surface 101 and the locking yoke 114 is rotationally positioned so that the capture point 116 lies at any point upon the capture surface 113 and constrains the sphere 100 at that point. The sphere 100 will also be captured if it is constrained only at first socket point 103, second socket point 104, and third socket point 105, and the locking yoke 114 is rotationally positioned so that the capture point 116 lies at any point upon the capture surface 113 and constrains the sphere 100 at that point. The sphere 100 will be captured in these circumstances because it will be constrained at four or more points that are not co-hemispheric.

Conversely, the sphere 100 will not be captured if it is constrained at the socket surface 101 or at first socket point 103, second socket point 104, and third socket point 105, but the locking yoke 114 is rotationally positioned so that the capture point 116 is not in contact with the capture surface 113. The sphere 100 will not be captured in these circumstances because all points of constraint will be co-hemispheric.

Thus, while FIG. 19 involves a different geometric configuration of the first socket point 103, second socket point 104, third socket point 105, socket surface 101, and capture surface 113 from those described above, the function of the locking yoke 114 is essentially the same, according to embodiments of the present invention. Locking yoke 114 can be rotated to alternate positions, so that the sphere 100 is alternately captured or released. The sphere 100 will be captured if it is constrained at four or more points that are not co-hemispheric. The sphere 100 will be released if all points of constraint are co-hemispheric.

FIGS. 14, 15, 16, 17, and 19 show idealized embodiments of the present invention in which the locking yoke 114 has a capture point 116 that at any one time contacts the sphere 100 at only one point. In practice, the capture point 116 will at any one time contact the sphere 100 at multiple points or at a surface with a smaller or greater area. In such practical circumstances, the sphere 100 will be captured if the locking yoke 114 and socket surface 101 collectively constrain the sphere 100 at four or more points that are not co-hemispheric; the sphere 100 will not be captured if all points of constraint are co-hemispheric.

In FIGS. 14, 15, 16, 17, and 19, no spring system or other biasing mechanism is shown. It will be readily apparent to one skilled in the art, however, that any of the locking yokes 114 in the embodiments of FIGS. 14, 15, 16, 17, and 19 may be fitted with springs or other biasing mechanisms to create a bias toward rotation of the locking yoke 114 in a desired direction. As has been discussed above and shown in FIGS. 1-9, such biasing can be useful because it can make the ball-and-socket system self-locking and provide resistance to releasing. However, such mechanical biasing is not a necessary or limiting feature of embodiments of the present invention or the appended claims.

Although some embodiments of the present invention are described with respect to a socket that permits free release of the ball when the yoke is in an open position, other embodiments of the present invention include sockets that can retain the ball against a slight or modest removing force without the capturing assistance of the locking yoke. For example, some embodiments of the present invention may comprise a socket that itself constrains the ball at four or more points that are not co-hemispheric. According to such embodiments, the materials out of which the ball and/or the socket are made may be slightly flexible and/or deformable, such that the ball may be slightly or modestly gripped within the socket without the assistance of the locking yoke, but the ball may nevertheless be released or "popped out" of the socket with slight or modest force when the yoke is in the open position. According to such embodiments of the present invention, even if the socket contacts and constrains the ball at four or more points that are not co-hemispheric when the ball is in the socket, the ball in such cases is not considered to be captured when the yoke is in an open position, because the ball in such instances may still be freely "popped in" and "popped out" of the socket with slight or modest effort and without the ball being captured in the socket by the locking yoke.

Although some embodiments of the present invention are described with respect to a U-shaped yoke having two arms rotationally coupled to the socket at two separate locations on the same axis of rotation, one of ordinary skill in the art, based on the disclosure herein, will recognize that multiple other locking yoke configurations may alternatively be used. For example, a one-armed locking yoke rotationally coupled to the socket at a single location may provide the necessary capture and release of the ball in the socket. Multiple one-armed yokes could be rotationally coupled to any one socket; multiple two-armed yokes could be rotationally coupled to any one socket; and combinations of one-armed yokes and two-armed yokes could be rotationally coupled to any one socket. Yokes having more than two arms and more than two rotational couplings with the socket may also be employed according to embodiments of the present invention.

The locking yoke may also be wholly or partially curved along its length, or not curved at all, according to embodiments of the present invention.

According to yet other embodiments of the present invention, different yokes may be biased toward movement in different directions. For example, one yoke could be biased to rotate in one direction, and another yoke could be biased to rotate in the opposite direction, yet both yokes could assist in capturing and releasing the ball within the socket. Such variously biased locking yokes could have a common axis of rotation or their axes of rotation could be parallel or divergent, for example.

Alternatively, two or more locking yokes of different configurations could be rotationally coupled to a single socket, with each yoke configured to capture and release balls of different dimensions, according to embodiments of the present invention.

Embodiments of the present invention may also include locking yokes having adjustable arms (e.g. arms in which the shape, length, spring resistance, or other characteristics may be varied) to accommodate different sizes and/or shapes of balls or to customize the capture point or points, according to embodiments of the present invention.

Although some embodiments of the present invention are described as including a ball 1, this is not a necessary element or limiting factor of the present invention. In some embodiments, a socket and yoke latch system may not include a ball, but may nevertheless capture and release any appropriately sized ball that the user of the latch system may desire to utilize. For example, the user of the present latch system may attach appropriately sized balls to a wide variety of different objects, and each such ball/object combination may then be releasably captured by the latch system. Thus, a latch system comprising nothing more than a socket and a rotatably couple yoked—without a ball—may be useful due to its versatility and ability to capture and release a wide range of ball-fitted objects supplied by the user. Accordingly, embodiments of the present invention include both socket and yoke latch systems with balls, and socket and yoke latch systems without balls. According to some embodiments of the present invention, socket and yoke latch systems may be made and sold independently; according to other embodiments of the present invention, socket and yoke latch systems may be made and/or sold as a kit with one or more balls and/or one or more ball attachments included.

Based on the disclosure provided herein, one of ordinary skill in the art will recognize the various suitable materials out of which the components may be made. For example, and without limitation, housing 3 and socket 4 may be molded in plastic and/or nylon, ball 1 and/or shaft 2 may be constructed in aluminum, springs 9, 10 and bolts 13, 14 and nuts 15, 16 may be steel, axles 11, 12 may be Delrin® molded, and yoke 8 may be nylon molded, according to embodiments of the present invention. Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. An apparatus comprising:
    a socket configured to constrain a ball;
    an axle coupled to the socket; and
    a yoke rotatably coupled to the axle, the yoke having an axis of rotation that intersects the ball when the ball is positioned in the socket,
    the yoke rotatable to a closed position in which the yoke captures the ball in the socket, the yoke rotatable to an open position in which the yoke does not capture the ball in the socket, wherein the yoke is biased toward the closed position by a torsion spring at the axis of rotation, wherein the torsion spring comprises a first end and a second end, wherein the first end engages the axle, wherein the second end engages the yoke, wherein the axle comprises a first slot configured to receive the first end, wherein the yoke comprises a second slot configured to receive the second end, wherein the axle comprises a first mating element, wherein the socket comprises a second mating element, and wherein the first end is engaged with the first slot and the second end is engaged with the second slot and the first mating element is aligned with the second mating element to preload the torsion spring.

2. The apparatus of claim 1, wherein the yoke is rotatably coupled to the axle at a single location.

3. The apparatus of claim 1, wherein the yoke is rotatably coupled to the axle at two locations.

4. The apparatus of claim 1, wherein the axis of rotation intersects a center of the ball when the ball is positioned in the socket.

5. The apparatus of claim 1, wherein the axis of rotation does not intersect a center of the ball when the ball is positioned in the socket.

6. The apparatus of claim 1, further comprising:
    the ball; and
    an attachment coupled to the ball.

7. The apparatus of claim 6, wherein the attachment is a shaft.

8. The apparatus of claim 6, wherein the attachment is selected from the group consisting of: a rod, a bar, a tab, a handle, a dog, a cord, a cable, a strap, a rope, a hook, a chain, and a wire.

9. The apparatus of claim 6, wherein the attachment is configured to be rotated against the yoke to move the yoke from the closed position toward the open position.

10. The apparatus of claim 6, wherein the attachment and the ball have three rotational degrees of freedom with respect to the socket while the yoke remains in the closed position while the ball is positioned in the socket.

11. An apparatus comprising:
    a ball;
    an attachment coupled to the ball;
    a socket configured to constrain the ball; and
    a yoke rotatably coupled to the socket, an axis of rotation of the yoke intersecting the ball when the ball is positioned in the socket,
    the yoke rotatable to a closed position in which the yoke captures the ball in the socket and in which radial forces applied to the ball by the attachment cannot release the ball from the socket without deforming the apparatus, wherein at least one point of contact of the yoke with the ball is between the axis of rotation and the attachment and
    the yoke rotatable to an open position in which the yoke does not capture the ball in the socket and permits removal of the ball from and insertion of the ball into the socket.

12. The apparatus of claim 11, wherein the attachment and the ball have three rotational degrees of freedom with respect to the socket while the yoke remains in the closed position while the ball is positioned in the socket.

13. The apparatus of claim 12, wherein the attachment and the ball have zero translational degrees of freedom with respect to the socket while the yoke remains in the closed position while the ball is positioned in the socket.

14. An apparatus comprising:
a ball;
an attachment coupled to the ball;
a socket configured to constrain the ball;
an axle coupled to the socket; and
a yoke rotatably coupled to the axle, the yoke having an axis of rotation that intersects the ball when the ball is positioned in the socket,
the yoke rotatable to a closed position in which the yoke captures the ball in the socket, the yoke rotatable to an open position in which the yoke does not capture the ball in the socket, wherein the yoke is biased toward the closed position by a torsion spring at the axis of rotation, wherein the torsion spring comprises a first end and a second end, wherein the first end engages the axle, wherein the second end engages the yoke, wherein the attachment and the ball have three rotational degrees of freedom with respect to the socket while the yoke remains in the closed position while the ball is positioned in the socket.

15. An apparatus comprising:
a socket configured to constrain a ball;
an axle coupled to the socket; and
a yoke rotatably coupled to the axle, the yoke having an axis of rotation that intersects the ball when the ball is positioned in the socket,
the yoke rotatable to a closed position in which the yoke captures the ball in the socket, the yoke rotatable to an open position in which the yoke does not capture the ball in the socket, wherein the yoke is biased toward the closed position by a torsion spring at the axis of rotation, wherein the torsion spring comprises a first end and a second end, wherein the first end engages the axle, wherein the second end engages the yoke, wherein the axle comprises a first slot, wherein the yoke comprises a second slot, and wherein the first end engages the first slot and the second end engages the second slot.

16. An apparatus comprising:
a socket configured to constrain a ball;
an axle coupled to the socket; and
a yoke rotatably coupled to the axle, the yoke having an axis of rotation that intersects the ball when the ball is positioned in the socket,
the yoke rotatable to a closed position in which the yoke captures the ball in the socket, the yoke rotatable to an open position in which the yoke does not capture the ball in the socket, wherein the yoke is biased toward the closed position by a torsion spring at the axis of rotation, wherein the torsion spring comprises a first end and a second end, wherein the first end engages the axle, wherein the second end engages the yoke, wherein the axle comprises a first mating element, wherein the socket comprises a second mating element, and wherein the first mating element is aligned with the second mating element to preload the torsion spring.

\* \* \* \* \*